(12) United States Patent
Mahieu et al.

(10) Patent No.: US 9,436,360 B2
(45) Date of Patent: Sep. 6, 2016

(54) CAPTURING AND SHARING VISUAL CONTENT VIA AN APPLICATION

(71) Applicant: CITRIX SYSTEMS, INC., Fort Lauderdale, FL (US)

(72) Inventors: Thomas Mahieu, Santa Barbara, CA (US); Shawn Erickson, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 364 days.

(21) Appl. No.: 14/044,055

(22) Filed: Oct. 2, 2013

(65) Prior Publication Data

US 2014/0101565 A1 Apr. 10, 2014

Related U.S. Application Data

(60) Provisional application No. 61/710,595, filed on Oct. 5, 2012.

(51) Int. Cl.
| | |
|---|---|
| *G06F 3/0484* | (2013.01) |
| *H04N 21/00* | (2011.01) |
| *H04M 3/56* | (2006.01) |
| *G06Q 10/10* | (2012.01) |

(52) U.S. Cl.
CPC .............. *G06F 3/0484* (2013.01); *H04M 3/56* (2013.01); *H04N 21/00* (2013.01); *G06Q 10/10* (2013.01)

(58) Field of Classification Search
CPC .................................................... G06F 3/0484
USPC ......................................................... 715/748
See application file for complete search history.

(56) References Cited

U.S. PATENT DOCUMENTS

| | | | |
|---|---|---|---|
| 6,317,777 B1 | 11/2001 | Skarbo et al. | |
| 2006/0277255 A1 | 12/2006 | Orsolini et al. | |
| 2006/0284981 A1* | 12/2006 | Erol ................. | G06F 17/30244 348/207.1 |
| 2011/0246904 A1* | 10/2011 | Pinto ..................... | G06F 9/4445 715/740 |

OTHER PUBLICATIONS

Anonymous: "Multipoint Video Conferencing", How Nefsis Cloud Computing, Parallel Processing and Standard Video Peripherals Deliver Multipoint HD Quality, While Reducing Cost & Complexity, Dec. 28, 2011, pp. 1-11, XP055094034, Retrieved from the Internet: URL:http://web.archive.org/web/20120510024800/http://www.nefsis.com/pdf/nefsis-video-conferencing-white-paper.pdf [retrieved on Dec. 17, 2013] p. 7.

(Continued)

*Primary Examiner* — Andrea Leggett
(74) *Attorney, Agent, or Firm* — BainwoodHuang

(57) ABSTRACT

Systems and method for capturing content for sharing are disclosed. In some aspects, a content capturing application is instantiated on a first computing device. A visual output providing application is instantiated for execution within the content capturing application. The visual output providing application does not execute independently of the content capturing application. The visual output providing application is configured to display an image. The image displayed by the visual output providing application is provided for presentation via the first computing device. At least a portion of the image displayed by the visual output providing application is captured via operation of the content capturing application. The captured at least the portion of the image displayed by the visual output providing application is transmitted via a network to a second computing device.

29 Claims, 25 Drawing Sheets

(56) References Cited

OTHER PUBLICATIONS

Anonymous: "Nefsis Video Conferencing Guide & Online User Manual. Share a Web Browser", May 10, 2012, XP055094035, Retrieved from the Internet: URL:http://web.archive.org/web/20120510143346/http://www.nefsis.com/manual/cc-share-browser.html, [retrieved on Dec. 17, 2013] the whole document.

* cited by examiner

CAPTURING AND SHARING VISUAL CONTENT VIA AN APPLICATION

CROSS-REFERENCE TO RELATED APPLICATIONS

This application claims priority under 35 U.S. C. §119(e) and the benefit of U.S. Provisional Application No. 61/710,595, filed Oct. 5, 2012, and entitled, "Capturing and Sharing Visual Content via an Application," the entire disclosure of which is incorporated herein by reference.

FIELD OF THE DISCLOSURE

The subject technology relates generally to communication technology and, in particular, to capturing and sharing visual content via an application.

BACKGROUND

Some operating systems of computing devices are configured to allow screen capturing of all visual content displayed via the operating system (e.g., visual content displayed via a display unit). The screen capturing can be used to share the visual content with remote computing device(s) via a network. However, other operating systems allow an application to screen capture visual content displayed via the application, but not visual content displayed via the operating system or via other application(s) executing within the operating system. Users of such other operating systems may, nevertheless, wish to screen capture visual content to share their visual content with others, for example, during an online meeting.

SUMMARY

In some aspects, the subject technology relates to a method for capturing content for sharing. The method includes instantiating a content capturing application on a first computing device. The method includes instantiating a visual output providing application for execution within the content capturing application, where the visual output providing application does not execute independently of the content capturing application, and where the visual output providing application is configured to display an image. The method includes providing for presentation of the image displayed by the visual output providing application via the first computing device. The method includes capturing, via operation of the content capturing application, at least a portion of the image displayed by the visual output providing application. The method includes facilitating transmission, via a network, of the captured at least the portion of the image displayed by the visual output providing application to a second computing device.

In some aspects, the subject technology relates to a non-transitory computer-readable medium storing instructions for capturing content for sharing. The instructions include code for instantiating a content capturing application on a first computing device. The instructions include code for instantiating a visual output providing application for execution within the content capturing application, where the visual output providing application does not execute independently of the content capturing application, and where the visual output providing application is configured to display an image. The instructions include code for providing for presentation of the image displayed by the visual output providing application via the first computing device. The instructions include code for capturing, via operation of the content capturing application, at least a portion of the image displayed by the visual output providing application. The instructions include code for facilitating transmission, via a network, of the captured at least the portion of the image displayed by the visual output providing application to a second computing device.

In some aspects, the subject technology relates to a computing device. The computing device includes one or more processors and a memory. The memory stores an operating system. The memory stores one or more applications, including a screen capturing application, executing within the operating system. The screen capturing application includes one or more embedded applications executing within the screen capturing application. The screen capturing application includes a screen capturing module programmed to capture an image generated by the one or more embedded applications.

DETAILED DESCRIPTION

As illustrated above, a technique for allowing a user of an operating system, that is not configured to allow an application to screen capture content that is not generated by the application, to screen capture and share visual content may be desirable. The subject technology provides techniques for screen capturing and sharing visual content via an application. In some aspects, a content capturing application (e.g., an online meeting application) is instantiated on a first computing device. A visual output providing application (e.g., a slide presentation application) is embedded within the content capturing application and instantiated for execution within the content capturing application. The visual output providing application presents image(s) on a display unit of the first computing device. The content capturing application screen captures at least a portion of the presented image of the visual output providing application. The content capturing application has access to the presented image as the visual output providing application executes within the content capturing application. The content capturing application facilitates transmission, via a network, of the captured presented image to a second computing device. The second computing device provides for display of the captured presented image on a display unit of the second computing device.

As used herein, the phrase "screen capture" encompasses its plain and ordinary meaning including, but not limited to, obtaining, at a local computing device, an image from a target for sharing the image with a remote computing device via a network. The target can be all or a portion of an image generated by an operating system of the local computing device or an application executing within the operating system of the local computing device.

Figure 1:
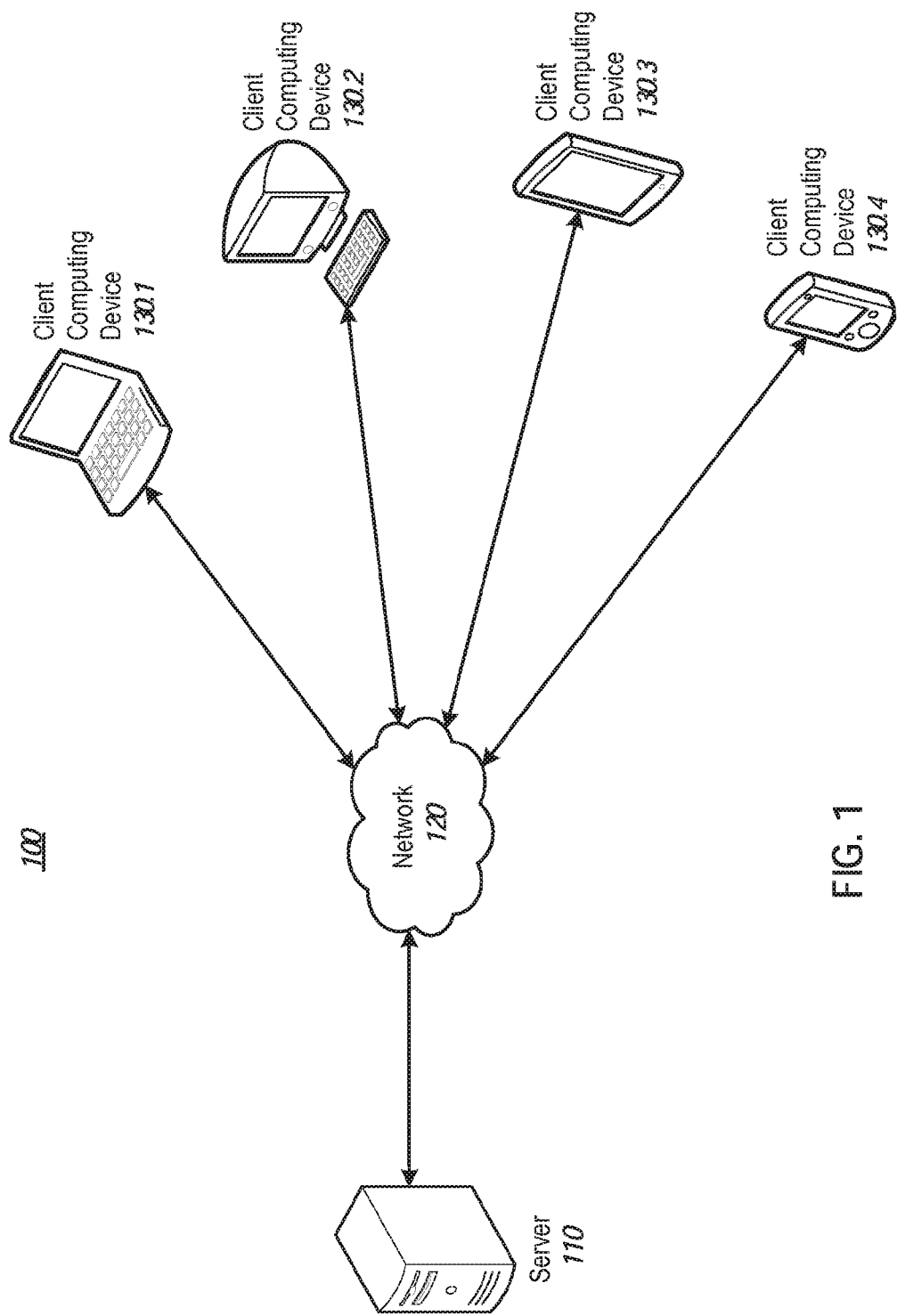
FIG. 1 illustrates an example system configured to capture and share visual content via an application.

FIG. 1 illustrates an example of a system 100 for capturing and sharing visual content via an application.

As shown, the system 100 includes a server 110 and client computing devices 130.-14 connected to one another via a network 140. The network 140 may include the Internet, an intranet, a local area network, a wide area network, a wired network, a wireless network, or a virtual private network (VPN). While only one server 110 and four client computing devices 130.1-4 are illustrated, the subject technology may be implemented in conjunction with any number of server(s) or client computing device(s).

The server 110 stores data and instructions. For example, the server 110 could store application(s) for capturing or sharing content which may be downloaded by the client computing device(s) 130.1-4. The server 110 could also store files or other data that is shared by or accessible to multiple client computing devices 130.1-4. The server 110 may be implemented as a single machine with a single processor, a multi-processor machine, or a server farm including multiple machines with multiple processors.

The client computing device(s) 130.1-4 can include one or more of a laptop computer 130.1, a desktop computer 130.2, a tablet computer 130.3, or a mobile phone 130.4. One or more of the client computing devices may include an operating system that allow an application to screen capture visual content displayed via the application, but not visual content displayed via the operating system or via other application(s) executing within the operating system. For example, a video conference application can screen capture image(s) generated by the video conference application, but not image(s) generated by a web browser or by home view of the operating system of the client computing device 130.k. Example operating systems meeting these specifications include Apple IOS®, developed by Apple Inc., of Cupertino, Calif. An example client computing device is described in more detail in conjunction with FIG. 2 below. In some examples, two or more of the client computing devices 130.1-4 may engage in an online meeting or a screen sharing session via the network 120.

Figure 2:
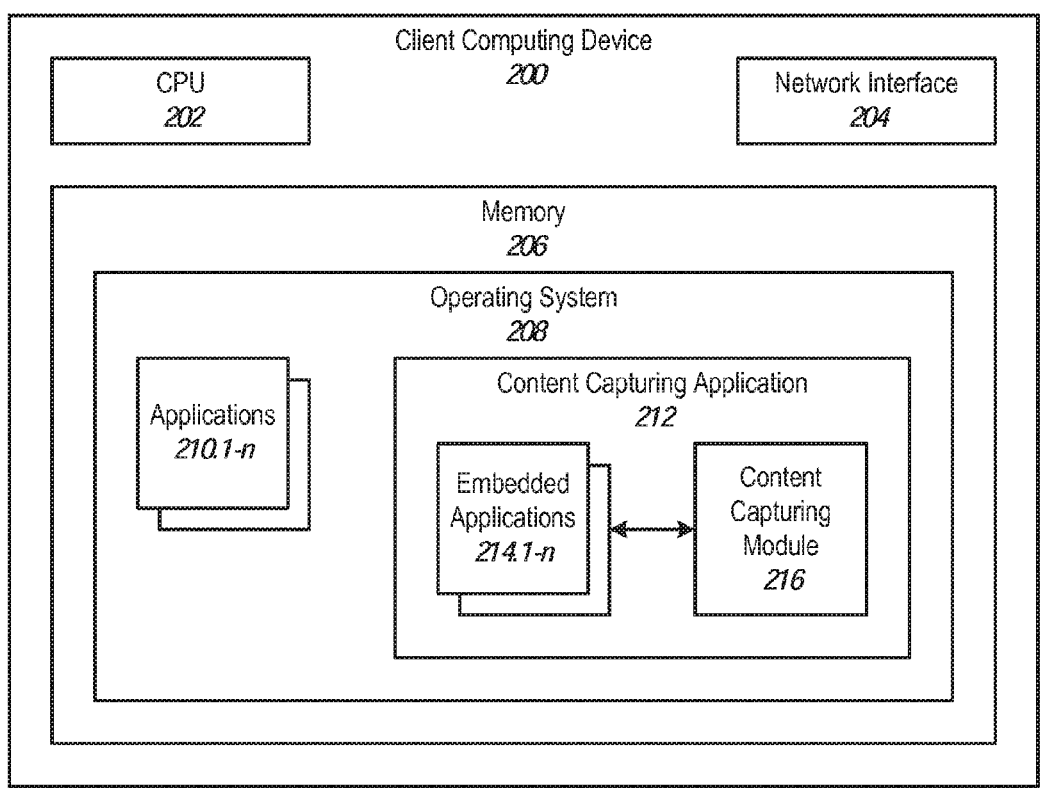
FIG. 2 illustrates an example of a client computing device configured to capture and share visual content via an application.

FIG. 2 illustrates an example of a client computing device 200 configured to capture and share visual content via an application.

The client computing device 200 can correspond to one or more of the client computing devices 130.1-4 of FIG. 1. As shown, the client computing device 200 includes a central processing unit (CPU) 202, a network interface 204, and a memory 206. The CPU 202 includes one or more processors. The CPU 202 is configured to execute computer instructions that are stored in a computer-readable medium, for example, the memory 206. The network interface 204 is configured to allow the client computing device 200 to transmit and receive data in a network, e.g., network 120 of FIG. 1. The network interface 204 may include one or more network interface cards (NICs). The memory 206 stores data or instructions. The memory 206 may be one or more of a cache unit, a storage unit, an internal memory unit, or an external memory unit. As illustrated, the memory 206 includes an operating system 208.

The operating system 208 may be any operating system for a client computing device, for example, a Microsoft Windows® operating system, a Google Chrome® operating system, a Google Android® operating system, an Apple IOS® operating system, or a Linux Ubuntu® operating system. In some aspects, the operating system 208 is configured to allow an application to screen capture visual content displayed via the application, but not visual content displayed via the operating system or via other application(s) executing within the operating system. In other aspects, the operating system 208 is configured to allow an application to screen capture any visual content generated by the operating system 208 or any application executing within the operating system 208. While the client computing device 200 is illustrated as having a single operating system 208, in some aspects, the client computing device 200 may host multiple operating systems.

As shown, the operating system 208 includes applications 210.1-n and a content capturing application 212. The applications 210.1-n may include any application(s) that execute within the operating system 208, for example, a web browser, a word processing application, a video playing application, an image viewing application, etc.

The content capturing application 212 can correspond to an online meeting or screen sharing application. The content capturing application 212 is configured to screen capture visual content and facilitate transmission of the screen captured visual content to a remote client computing device (e.g., during an online meeting or a screen sharing session). The content capturing application 212 can access the network (e.g., network 120) and can transmit any image(s) generated within the content capturing application 212 via the network. The content capturing application 212 includes one or more embedded applications 214.1-n that execute within the content capturing application 212. As a result of the embedded applications 214.1-n executing within the content capturing application 212, the content capturing application 212 has access to the image(s) that the embedded applications 214.1-n provide to the display unit, and can capture and transmit these image(s) to a remote computing device via the network. The content capturing application 212 also includes a content capturing module 216 that is coupled with the embedded applications 214.1-n. The content capturing module 216 is configured to access the image(s) (e.g., the pixels) that the embedded applications 214.1-n provide to the display unit, and screen capture and transmit these image(s) to a remote computing device via the network.

The embedded applications 214.1-n can include one or more of a web browser, an image (e.g., photograph) viewing application, a slide presentation application, a word processing application, a file sharing application, or a sketch pad application. The embedded applications 214.1-n are internal applications to the content capturing application 212. In some aspects, an embedded application 214.k provides both a visual output and an audio output. For example, the embedded application 214.k can be a video player application (for playing a locally-stored video or an online video, e.g., within a web browser) or an audio player application. In such circumstances, the content capturing application 212 is configured to transmit, via the network, the audio output provided by the embedded application 214.k in conjunction with the visual output. As a result, a user of a remote computing device can have access to both the audio output and the visual output of the embedded application 214.k executing on the client computing device 200. FIG. 5B illustrates an example of a menu, presented within the content capturing application 212, for selecting an embedded application 214.1-n to instantiate. The available embedded applications 214.1-n are cloud storage ("Share from the Cloud"), web browser ("Share from the Browser"), photo viewer ("Share a Photo"), or sketch pad ("Share a Whiteboard"). As set forth in FIG. 5B, a user of the client computing device 200 can tap his/her finger or a stylus to select the embedded application 214.k using which he/she wishes to share content from the menu. FIG. 5D illustrates an example of a web browser executing within a content capturing application. In some aspects, a web browser that is an embedded application 214.k can be used to open a file (e.g., a photograph or a text file) stored locally on the client computing device 200 that is to be shared or to open a webpage or a file stored remotely (e.g., a file stored in a web-based electronic messaging program).

One operation of the client computing device 200 is described in greater detail in conjunction with FIG. 3, below.

Figure 3:
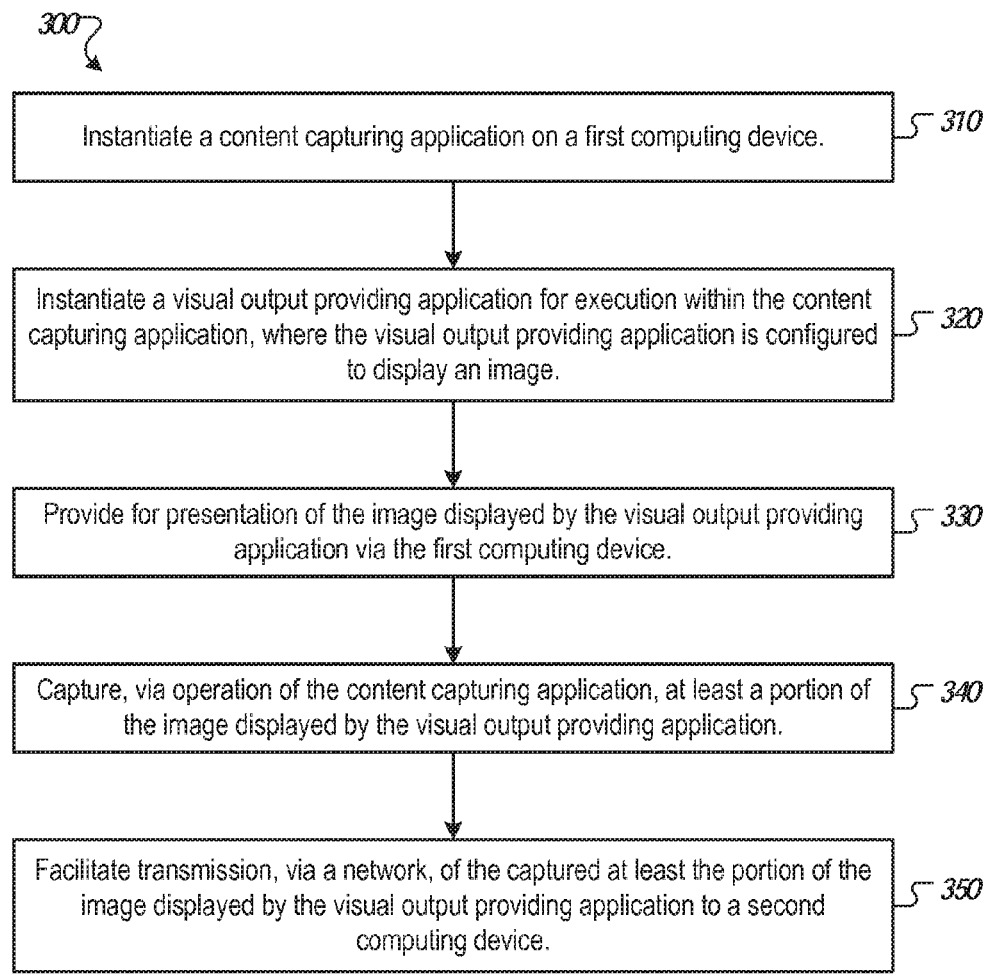
FIG. 3 illustrates an example process by which visual content may be captured and shared via an application.

FIG. 3 illustrates an example process 300 by which visual content may be captured and shared via an application.

The process 300 begins at step 310, where a first computing device (e.g., client computing device 200 or one of client computing devices 130.1-4) instantiates a content capturing application (e.g., content capturing application 212). For example, a user of the first computing device may select the content capturing application for example, using a touch screen or a mouse. The first computing device can be a tablet computer, a mobile phone, a laptop computer, a desktop computer, etc. In some aspects, the content capturing application can be an online meeting or screen sharing application.

In step 320, the first computing device instantiates a visual output providing application (e.g., one of the embedded applications 214.1-n) for execution within the content capturing application. The visual output providing application is embedded in the content capturing application. In some example, the visual output providing application does not execute independently of the content capturing application. The visual output providing application is configured to display image(s). For example, the visual output providing application can be one or more of a web browser, an image viewing application, a slide presentation application, a word processing application, a file sharing application, or a sketch pad application.

In step 330, the first computing device provides for presentation of the image displayed by the visual output providing application via the first computing device, for example, on a display unit of the first computing device.

In step 340, the first computing device captures, via operation of the content capturing application (e.g., via operation of the content capturing module 216 of the content capturing application 212) at least a portion of the image displayed by the visual output providing application. The content capturing application screen captures the visual output providing application. For example the content capturing application may capture pixels that the visual output providing application provides to the display unit.

In step 350, the first computing device facilitates transmission, via a network (e.g., network 120), of the captured at least the portion of the image displayed by the visual output providing application to a second computing device (e.g., one of the computing devices 130.1-4 that is different from the first computing device; in one example, the first computing device is tablet computer 130.3 and the second computing device is laptop computer 130.1). The captured at least the portion of the image displayed by the visual output providing application can now be displayed via a display unit of the second computing device.

In some aspects, the content capturing application is an online meeting or screen sharing application, and the first computing device and the second computing device are used by participants in the online meeting. In some aspects, a user of the first computing device annotates (e.g., by drawing or writing text) the image displayed by the visual output providing application. The captured image displayed by the visual output providing application is transmitted to the second computing device in conjunction with the annotation, so that the user of the second computing device can view the annotation. One example of an annotation by drawing is illustrated in FIG. 5O.

In some aspects, the image displayed by the visual output providing application is overlaid, on the first computing device, with additional content. For example, as illustrated in FIG. 5Q, the visual output providing application (web browser) is overlaid with an incoming video stream at the bottom right corner and control buttons at the bottom left corner. The video stream may be received from the second computing device. The control buttons may be for controlling the content capturing application, for example, to start or stop the screen sharing, as illustrated in FIG. 5D with a bubble saying, "Tap to share your screen." The image from the visual output providing application can be transmitted to the second computing device without the overlaid additional content. As a result, a user of the second computing device may see the page displayed in the visual output providing application (web browser), but not the video stream or the control buttons. In some aspects, different content can overlay the page displayed in the visual output providing application on the first computing device and on the second computing device, or the second computing device can have no content overlaying the page. After step 350, the process 300 ends.

Figure 5A:
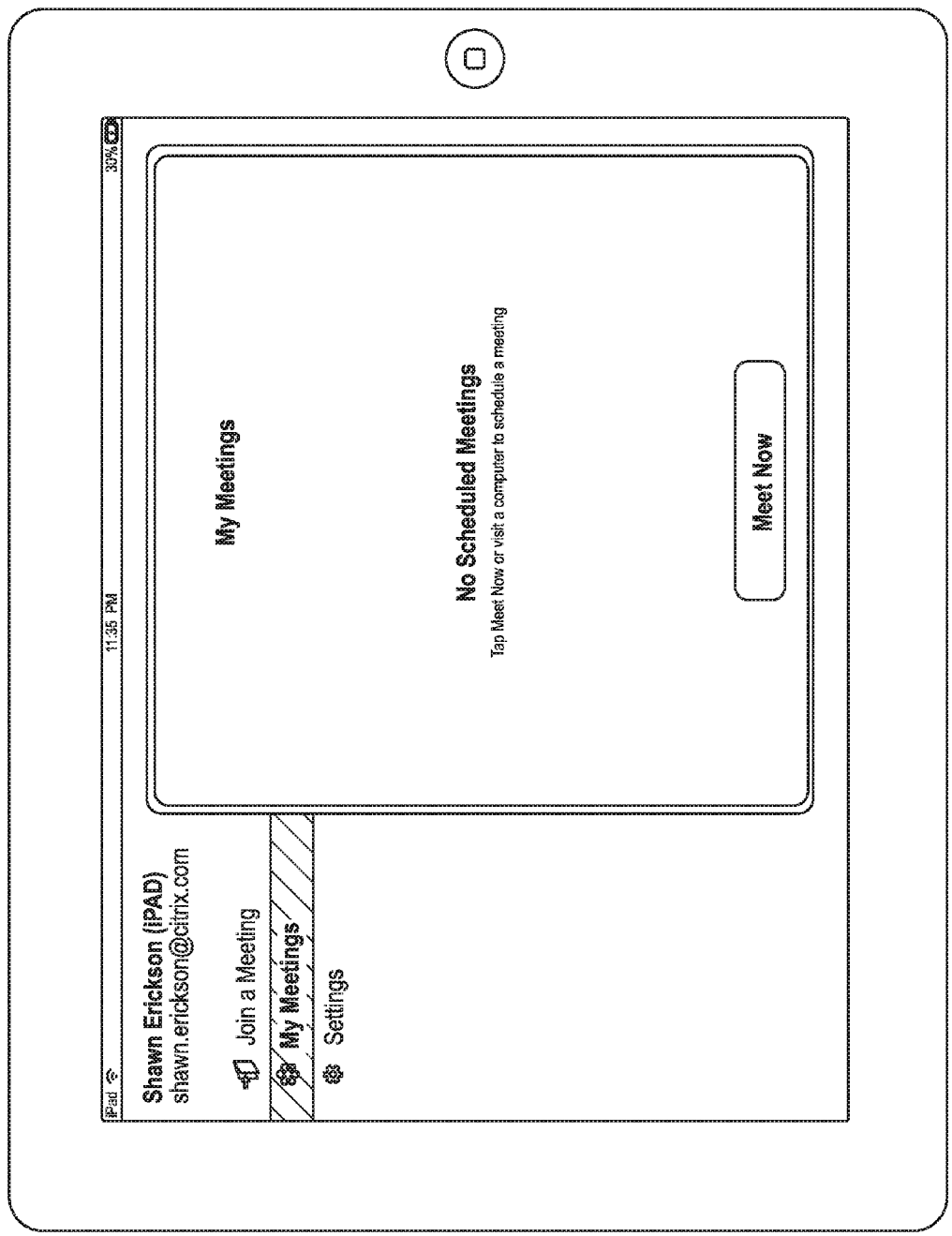
FIGS. 5A-5U illustrate example user interfaces for capturing and sharing visual content via an application.
Figure 5B:
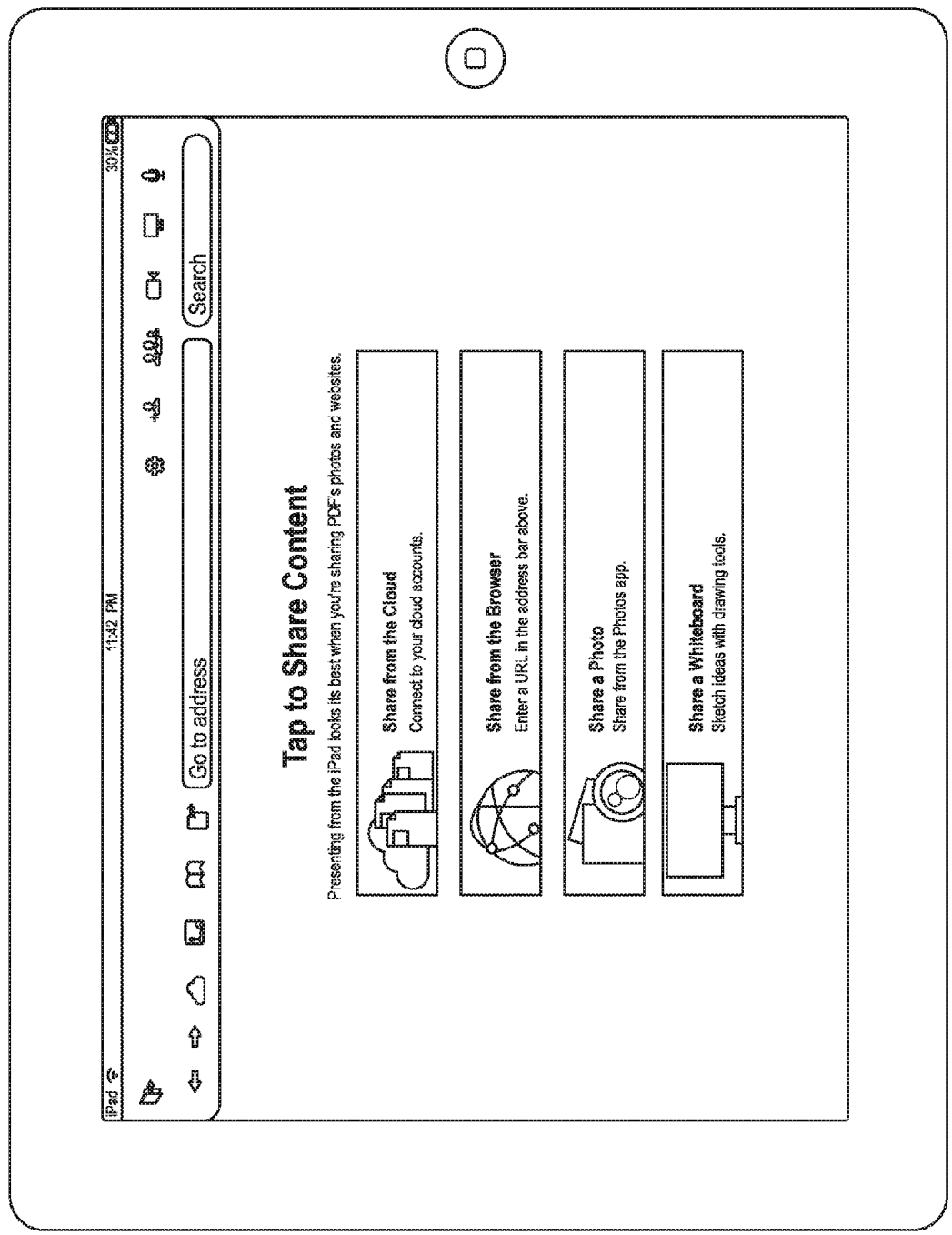
Figure 5C:
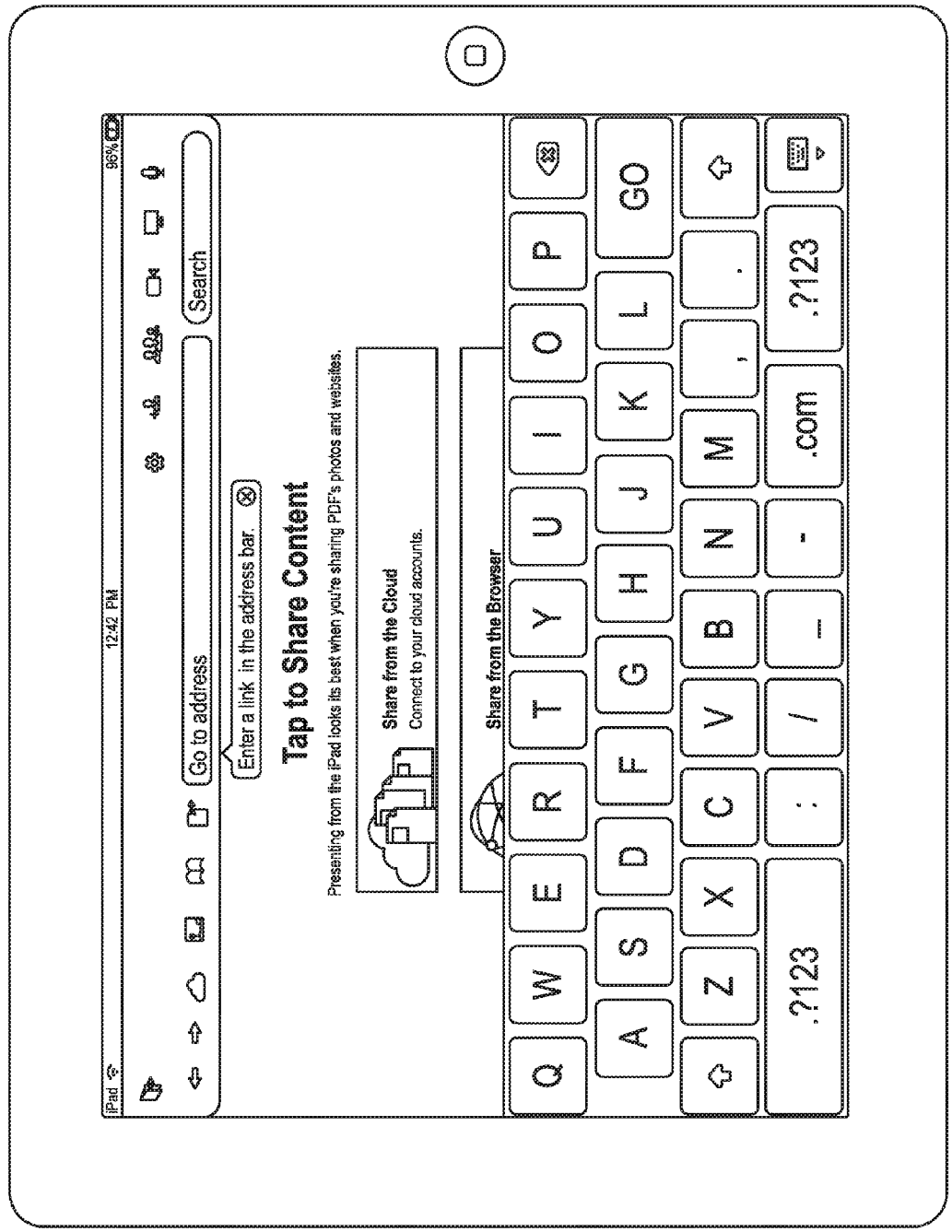
Figure 5D:
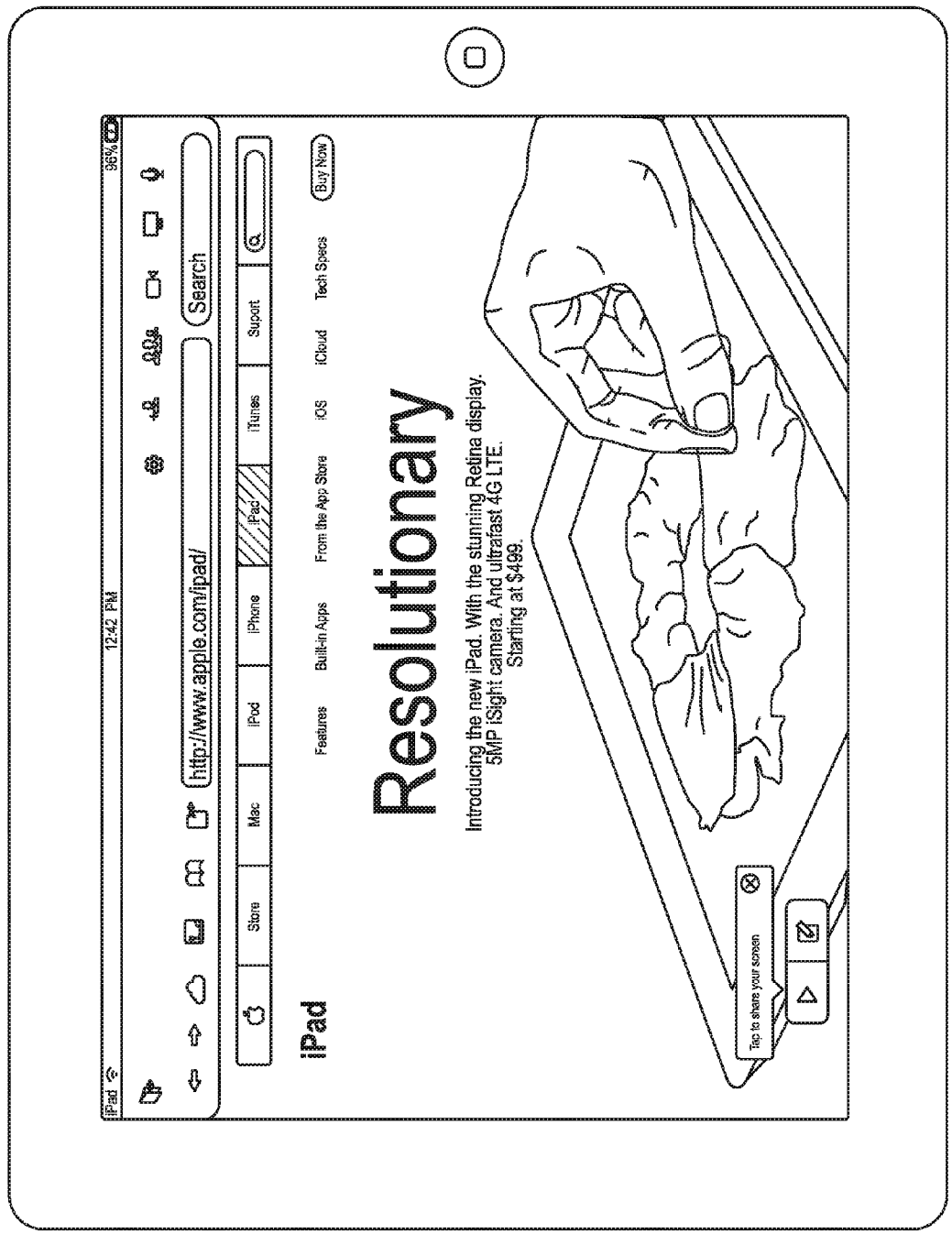
Figure 5E:
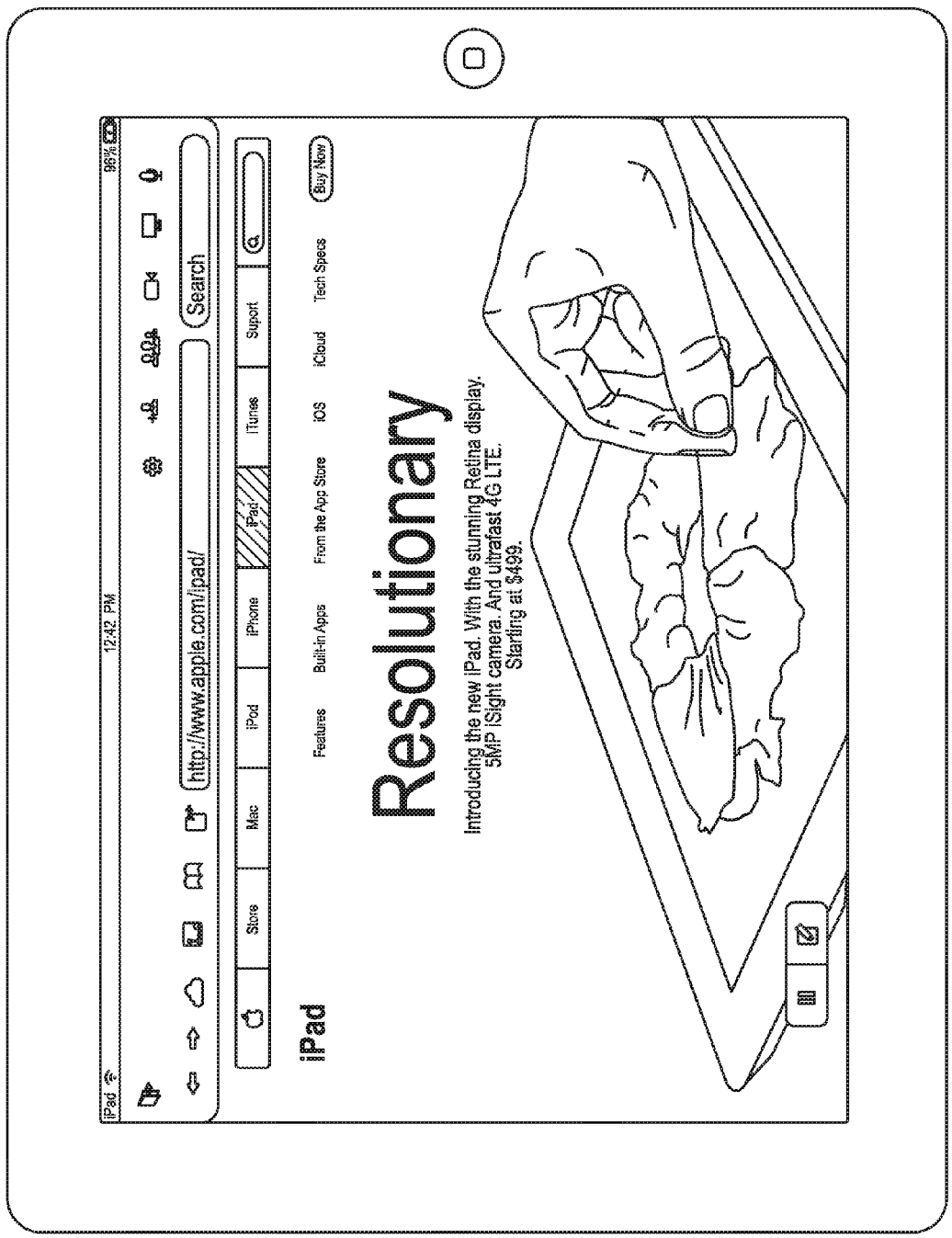
Figure 5F:
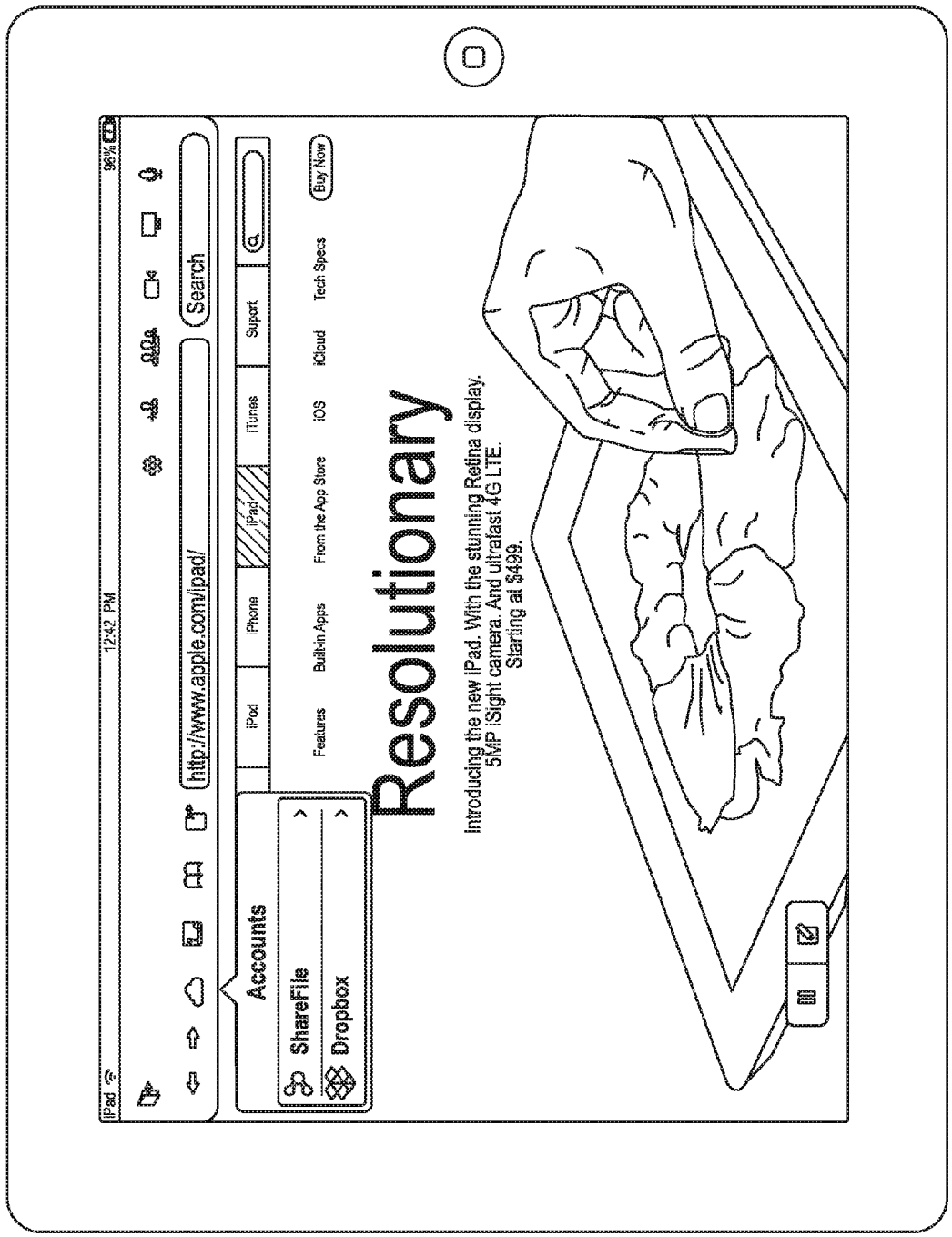
Figure 5G:
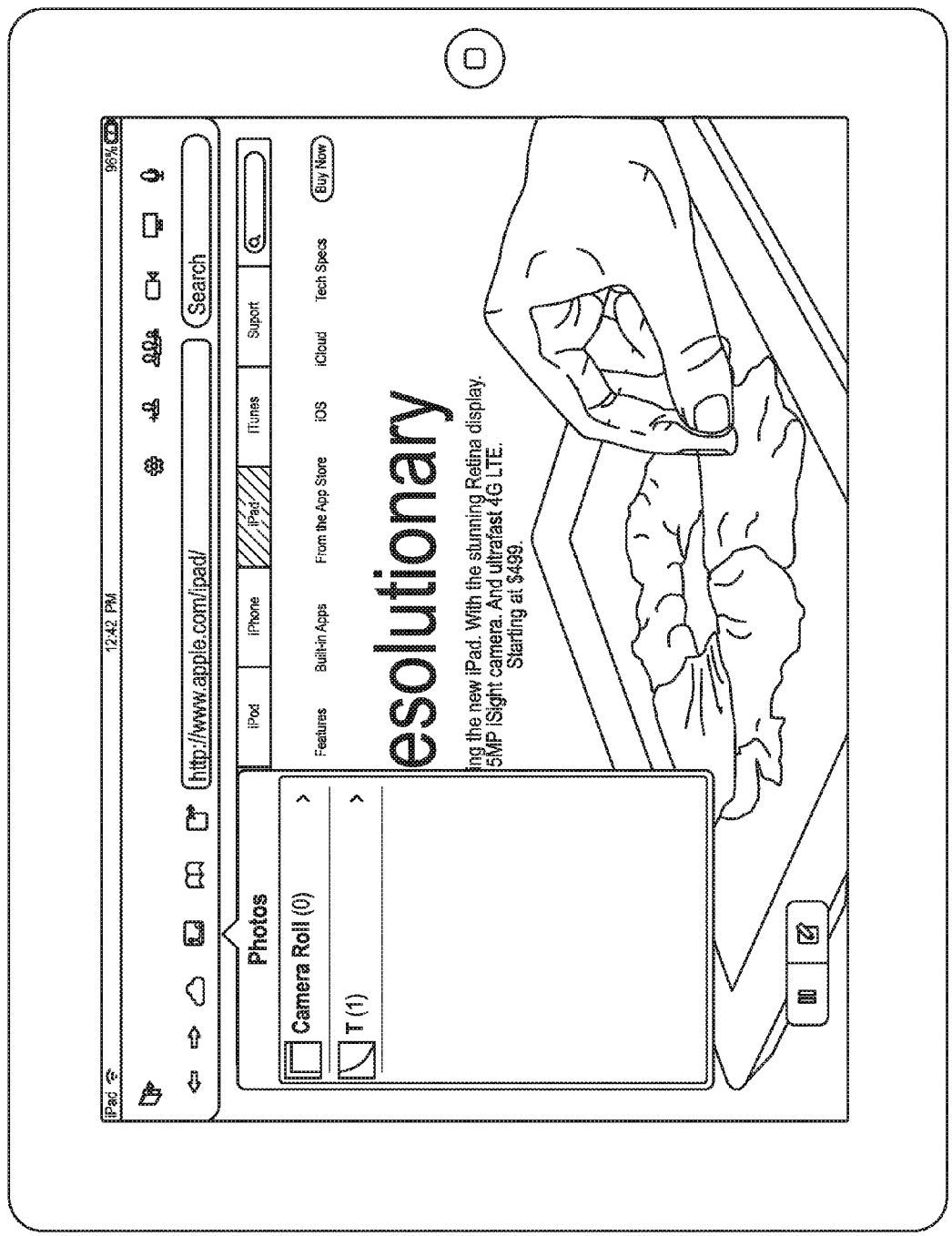
Figure 5H:
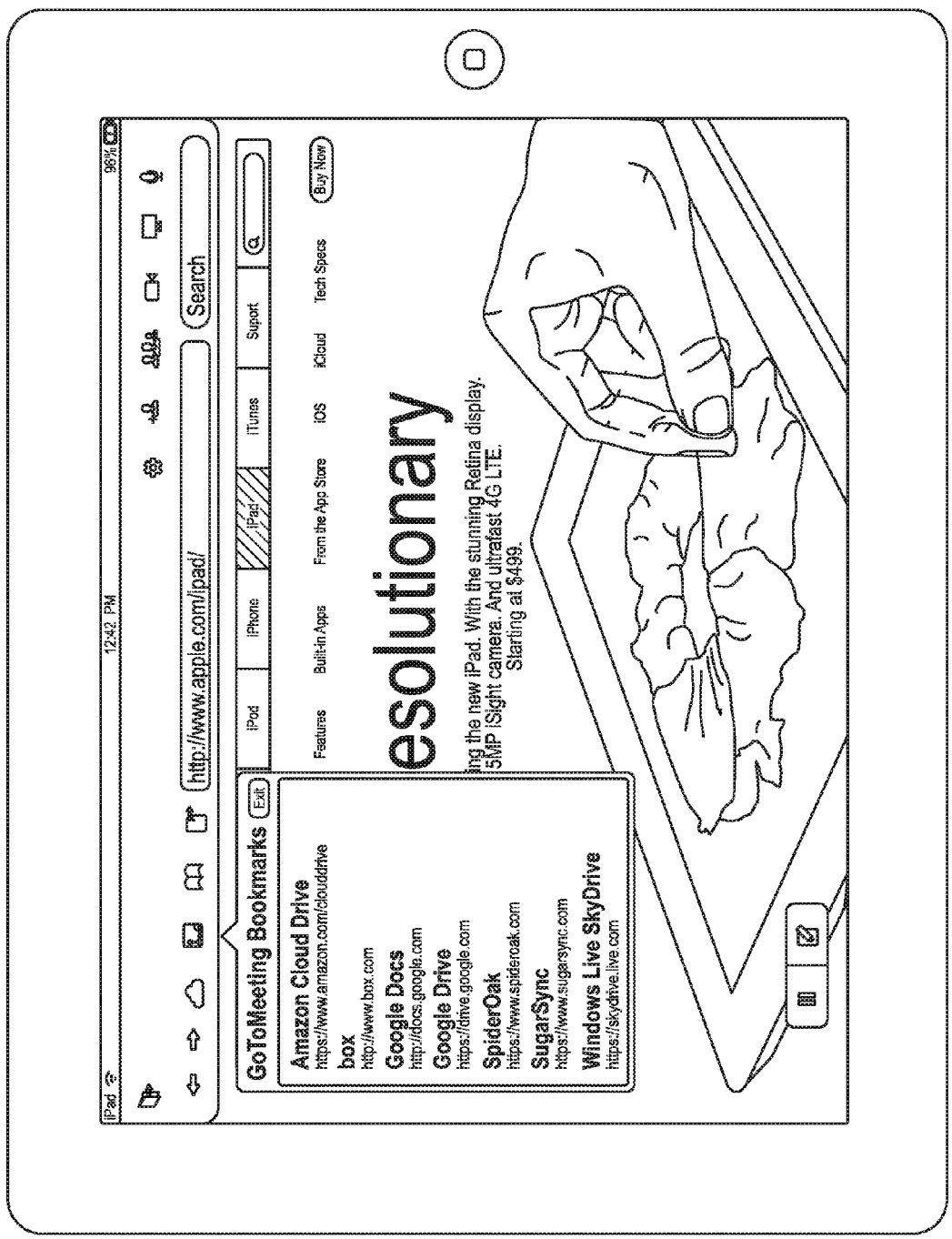
Figure 5I:
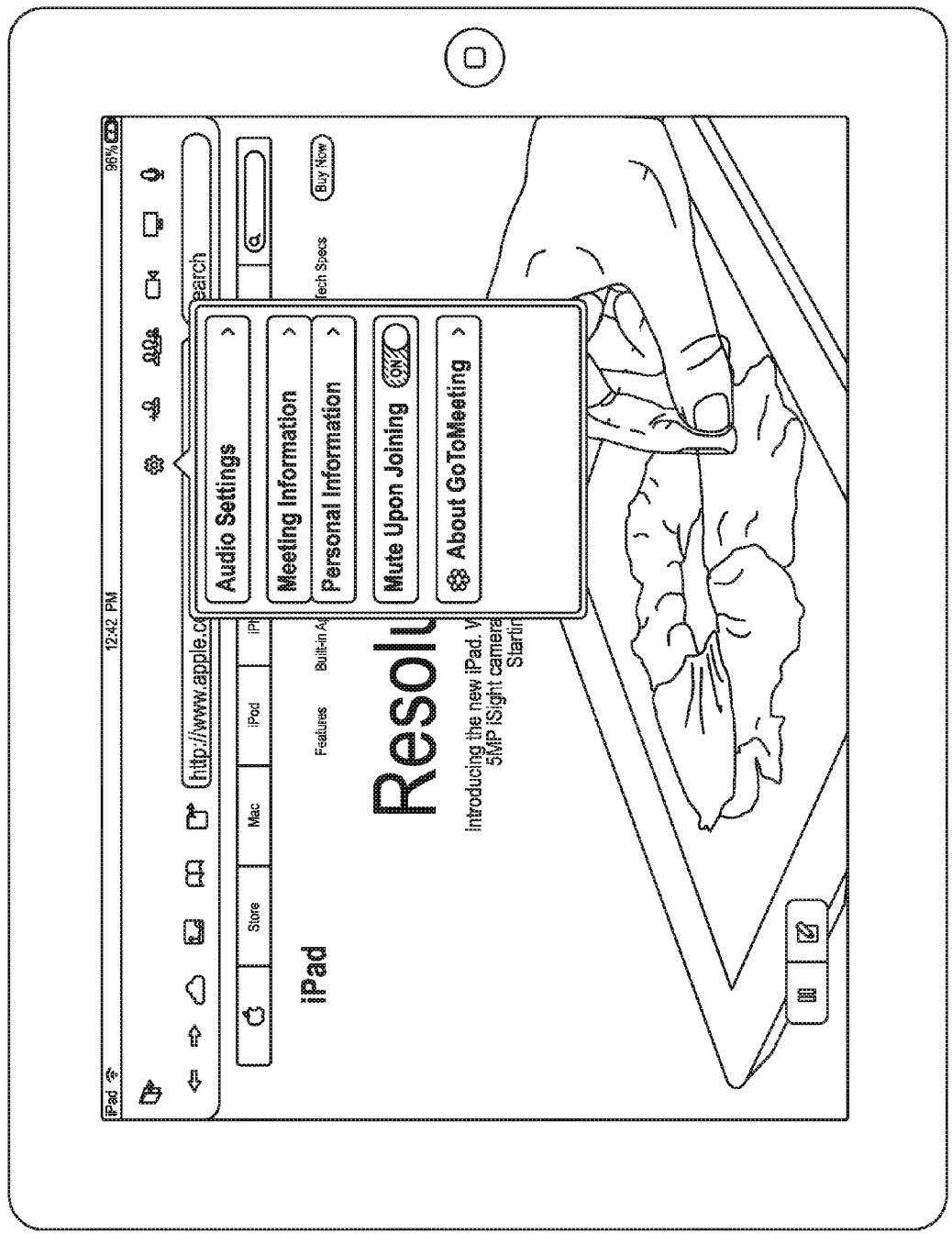
Figure 5J:
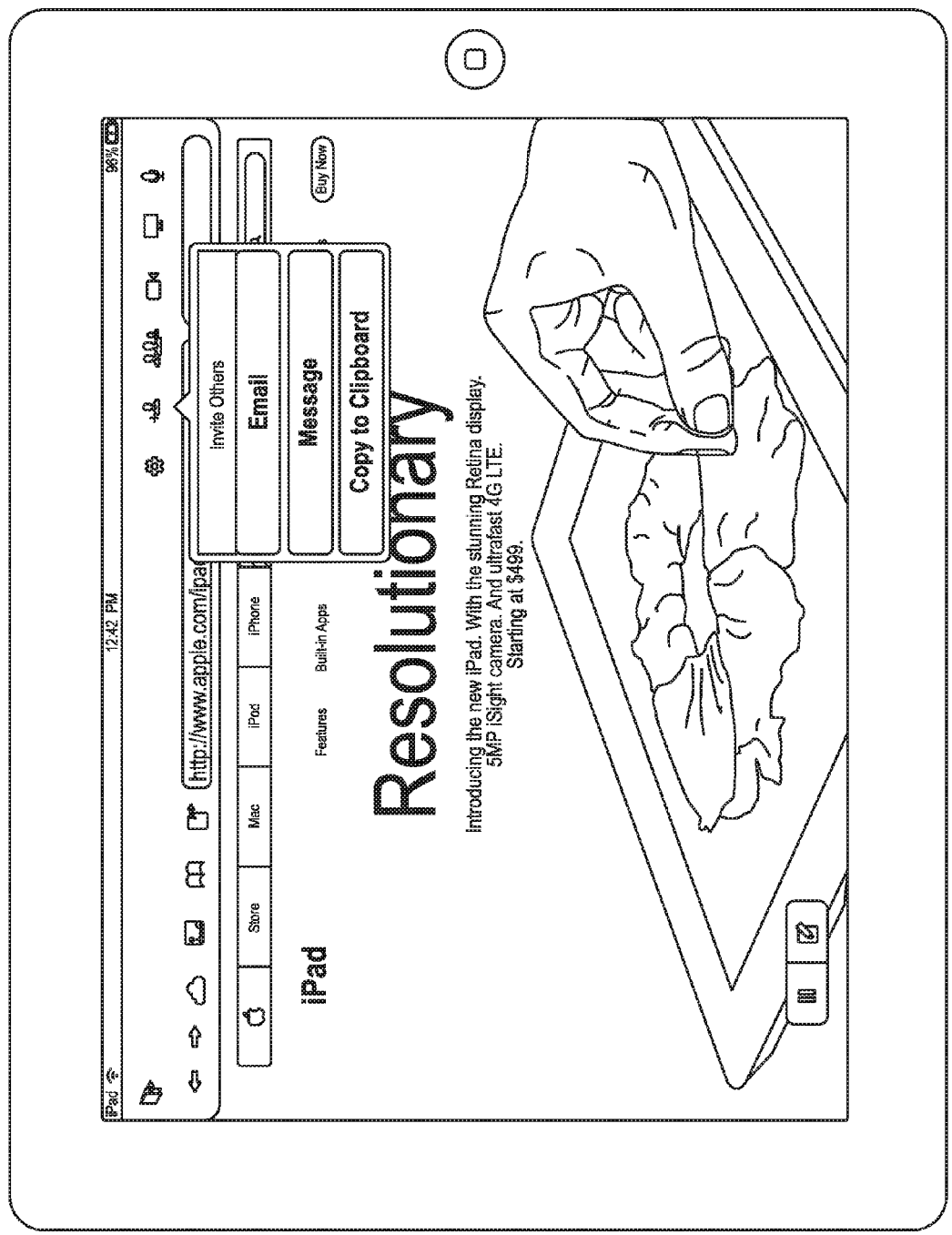
Figure 5K:
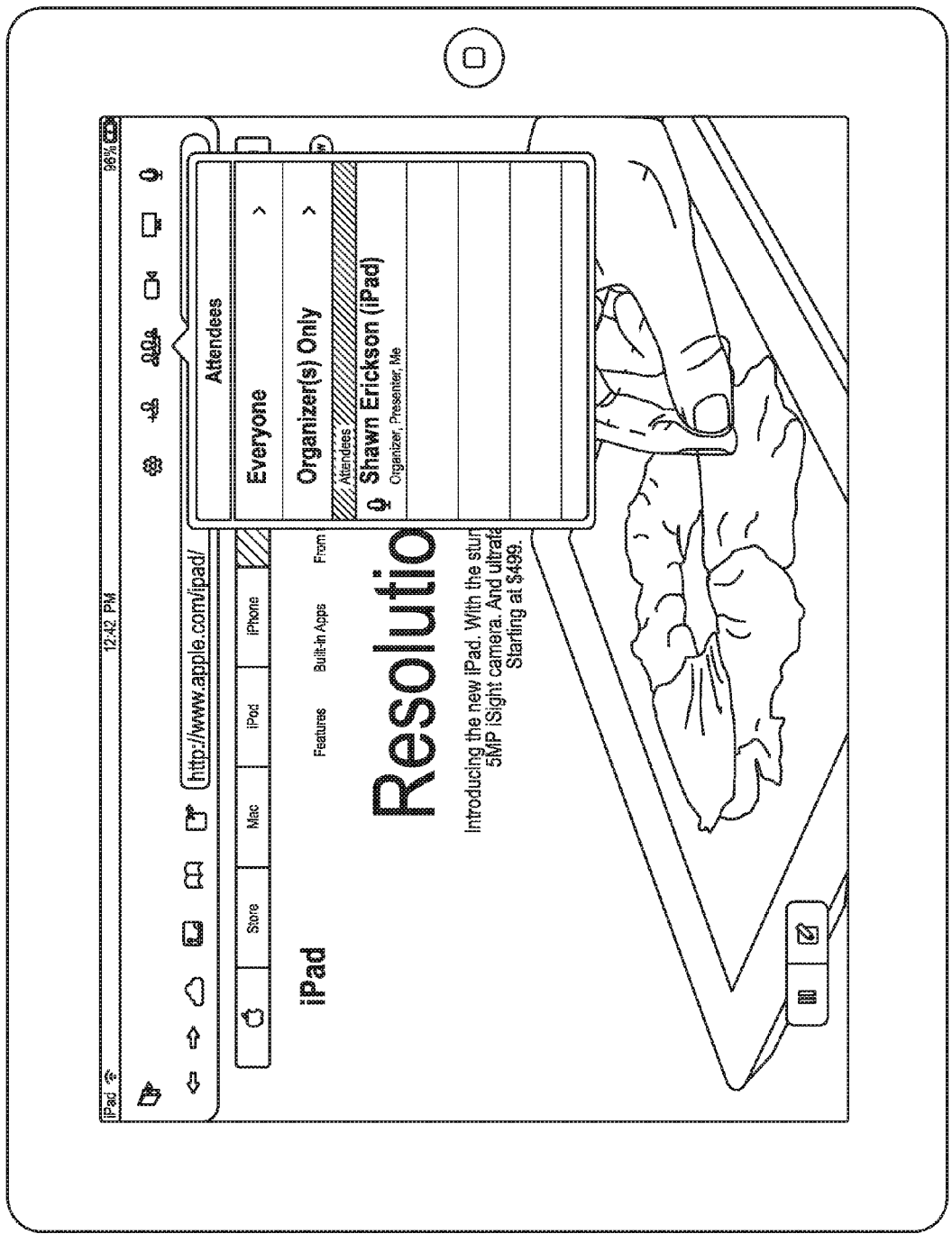
Figure 5L:
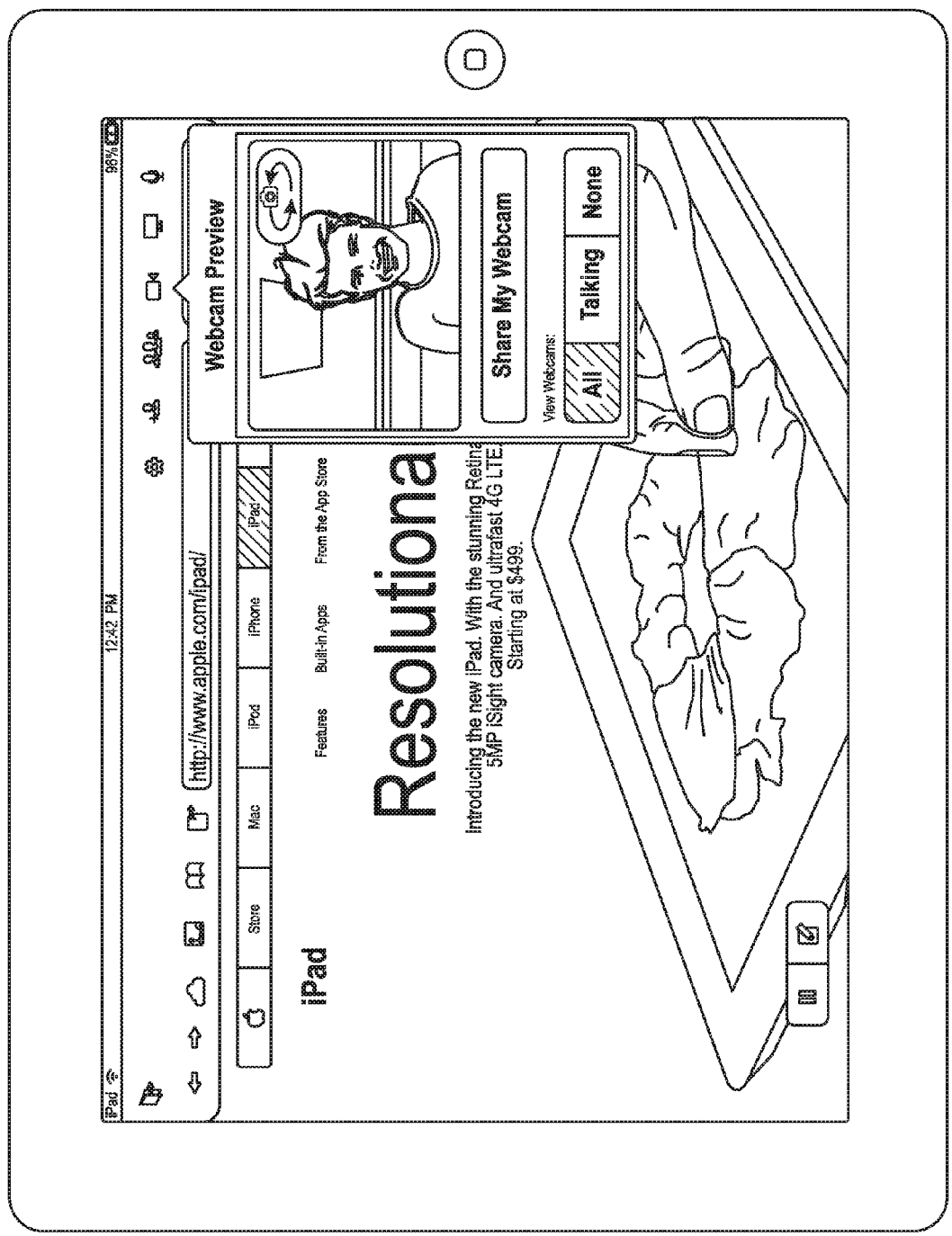
Figure 5M:
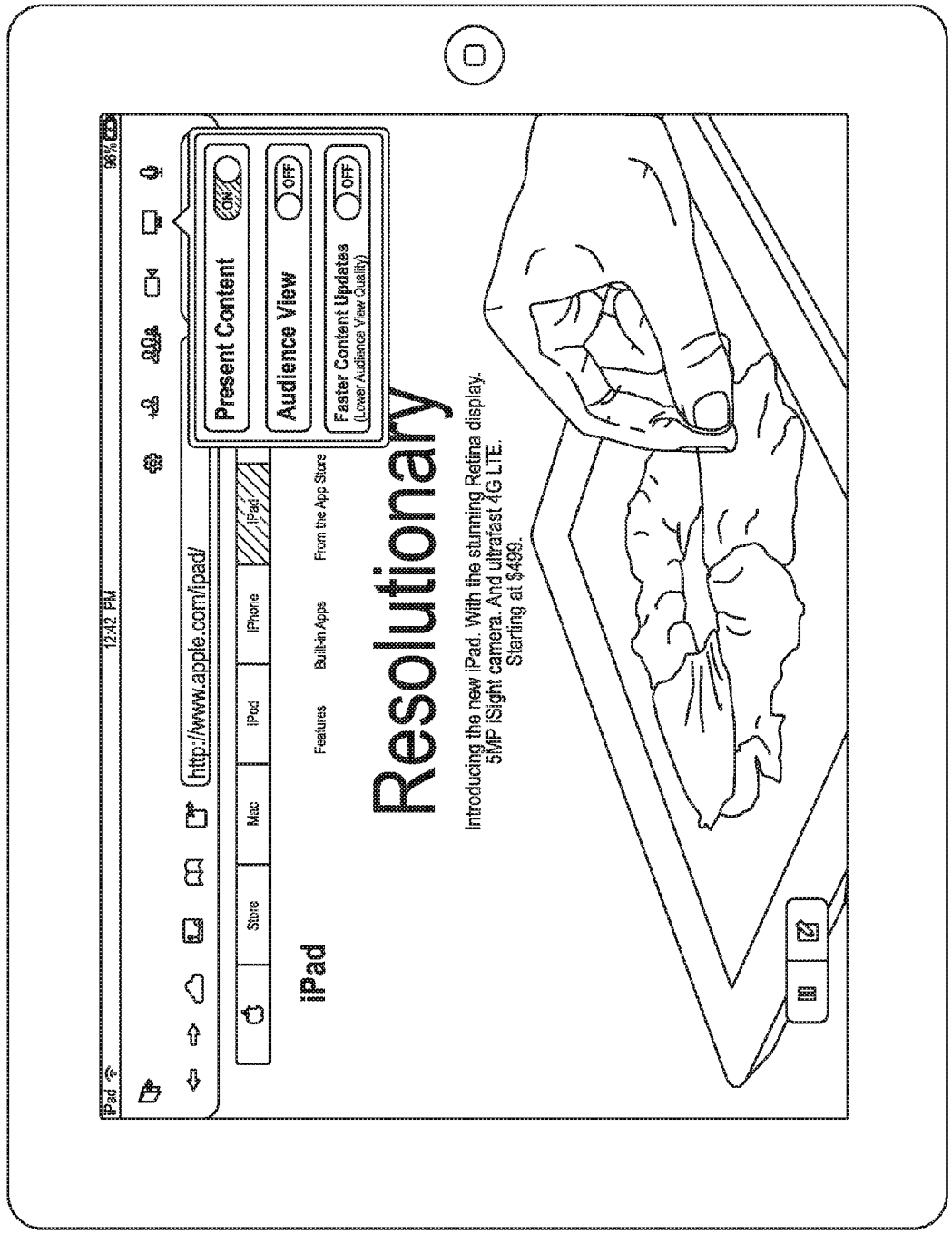
Figure 5N:
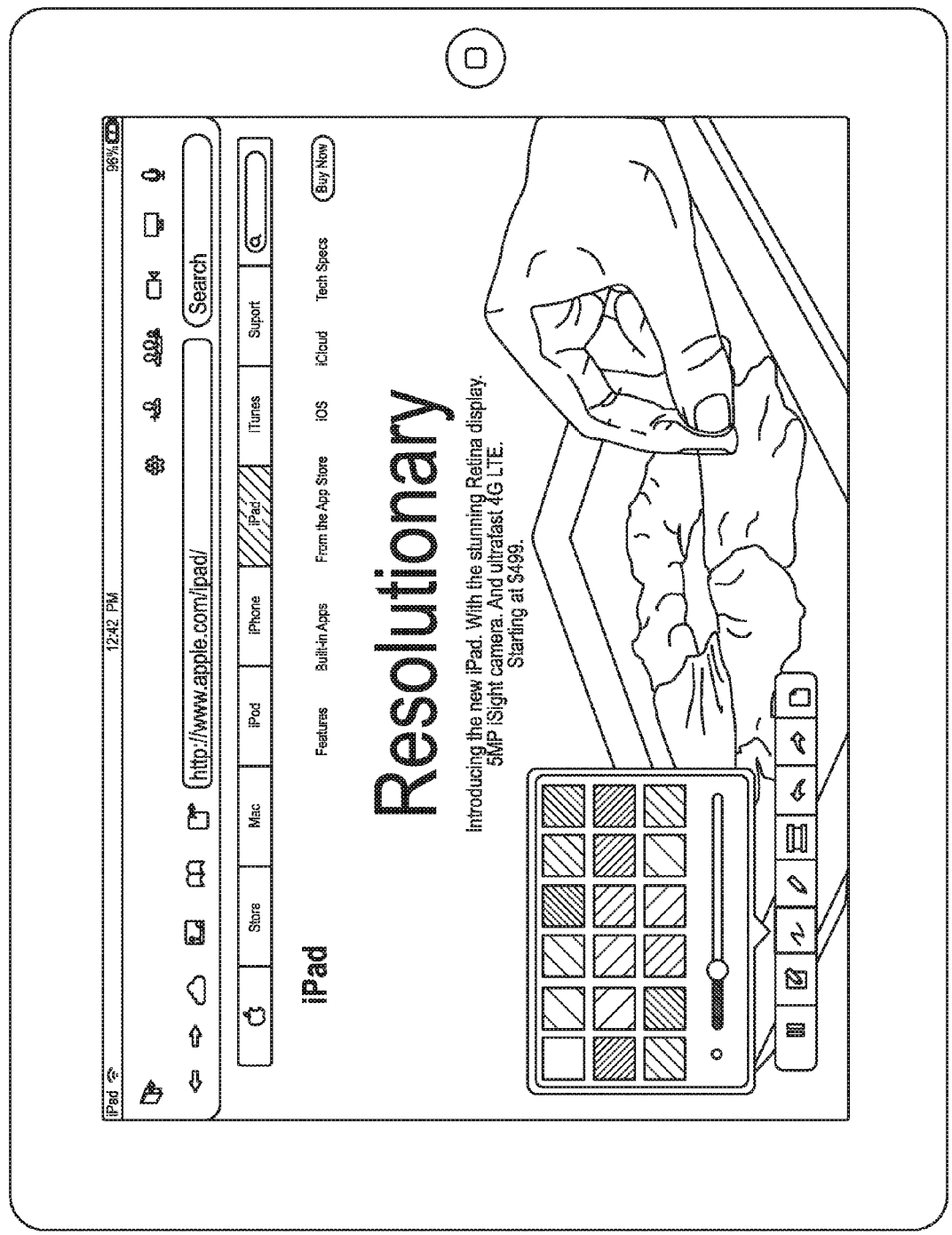
Figure 50:
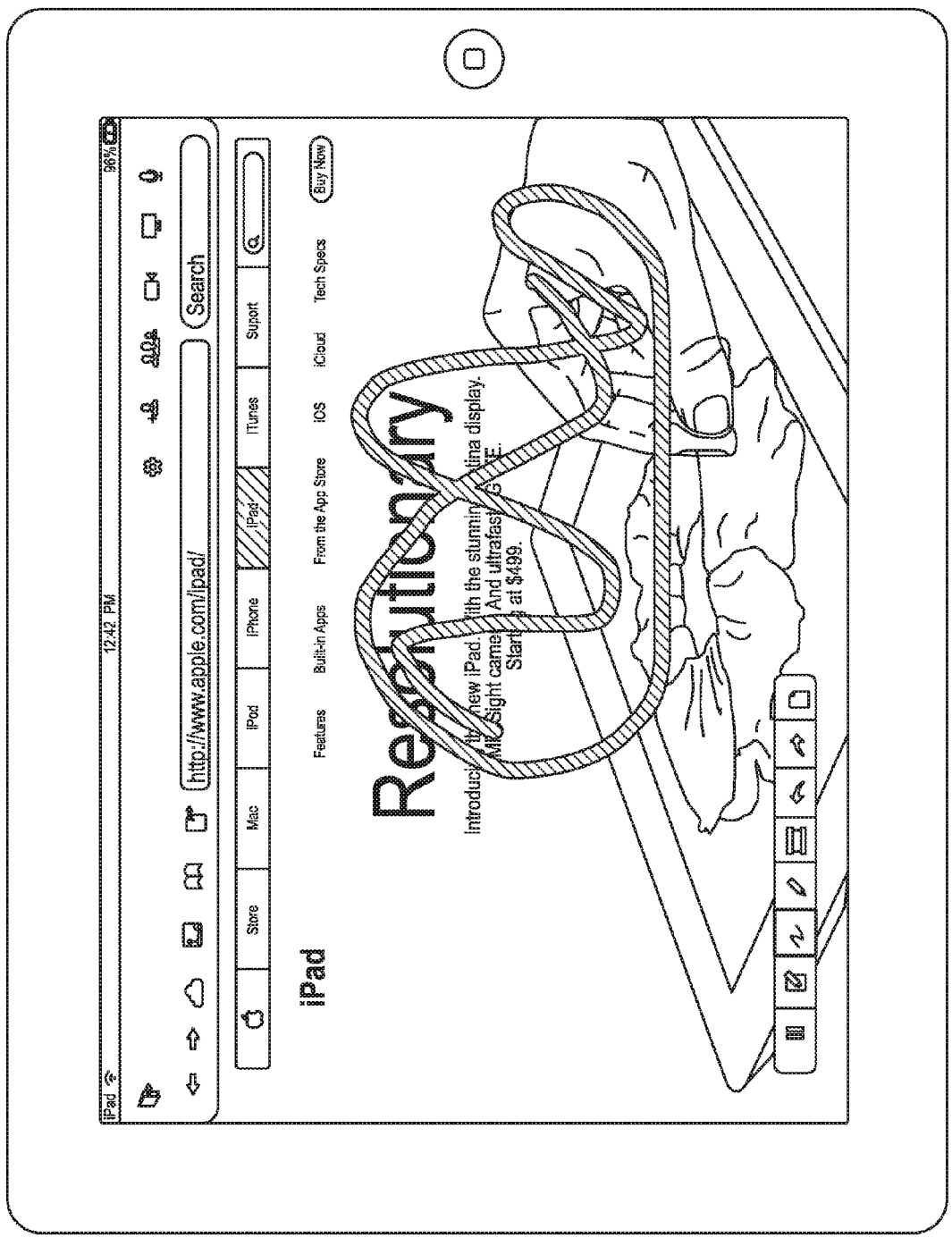
Figure 5P:
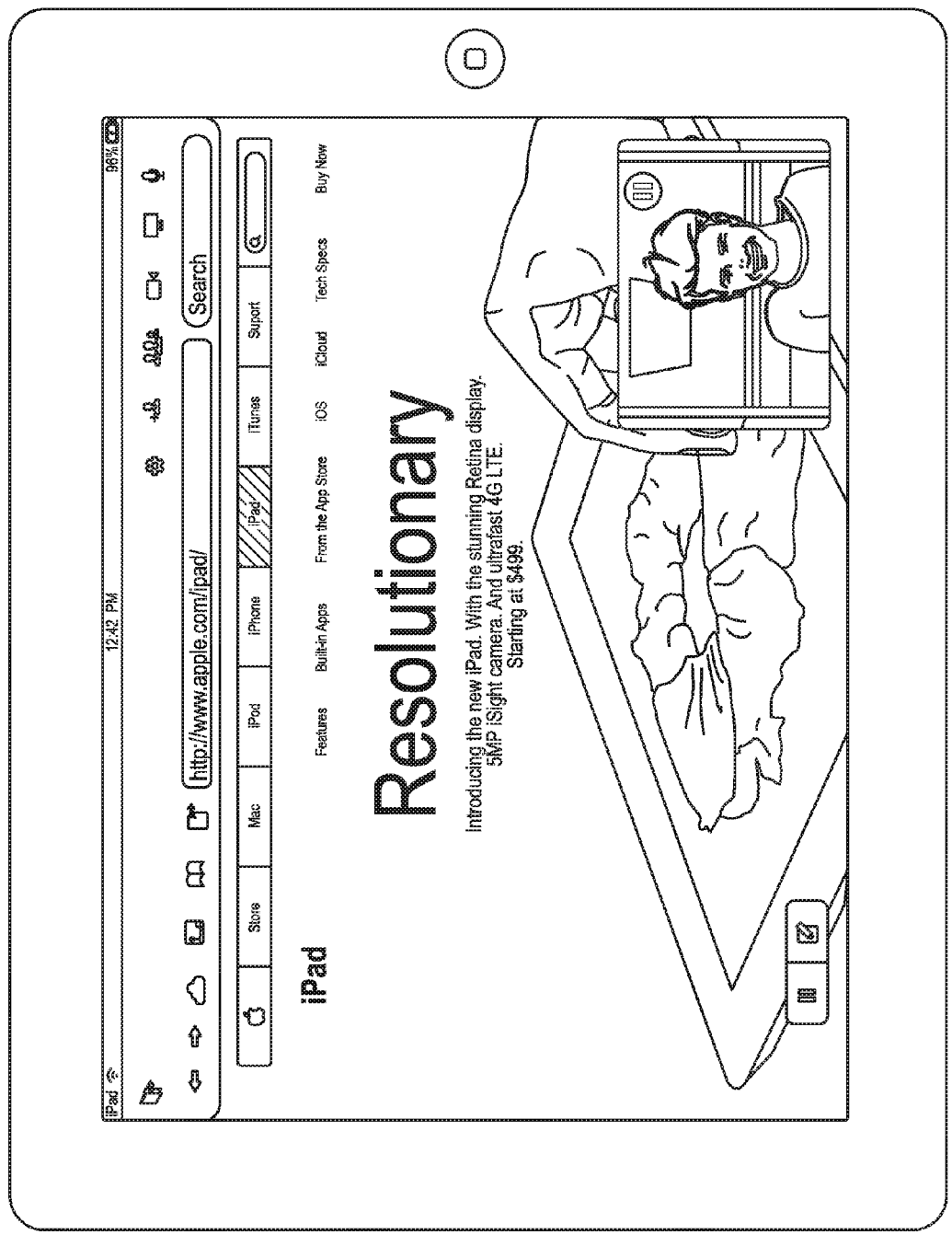
Figure 5Q:
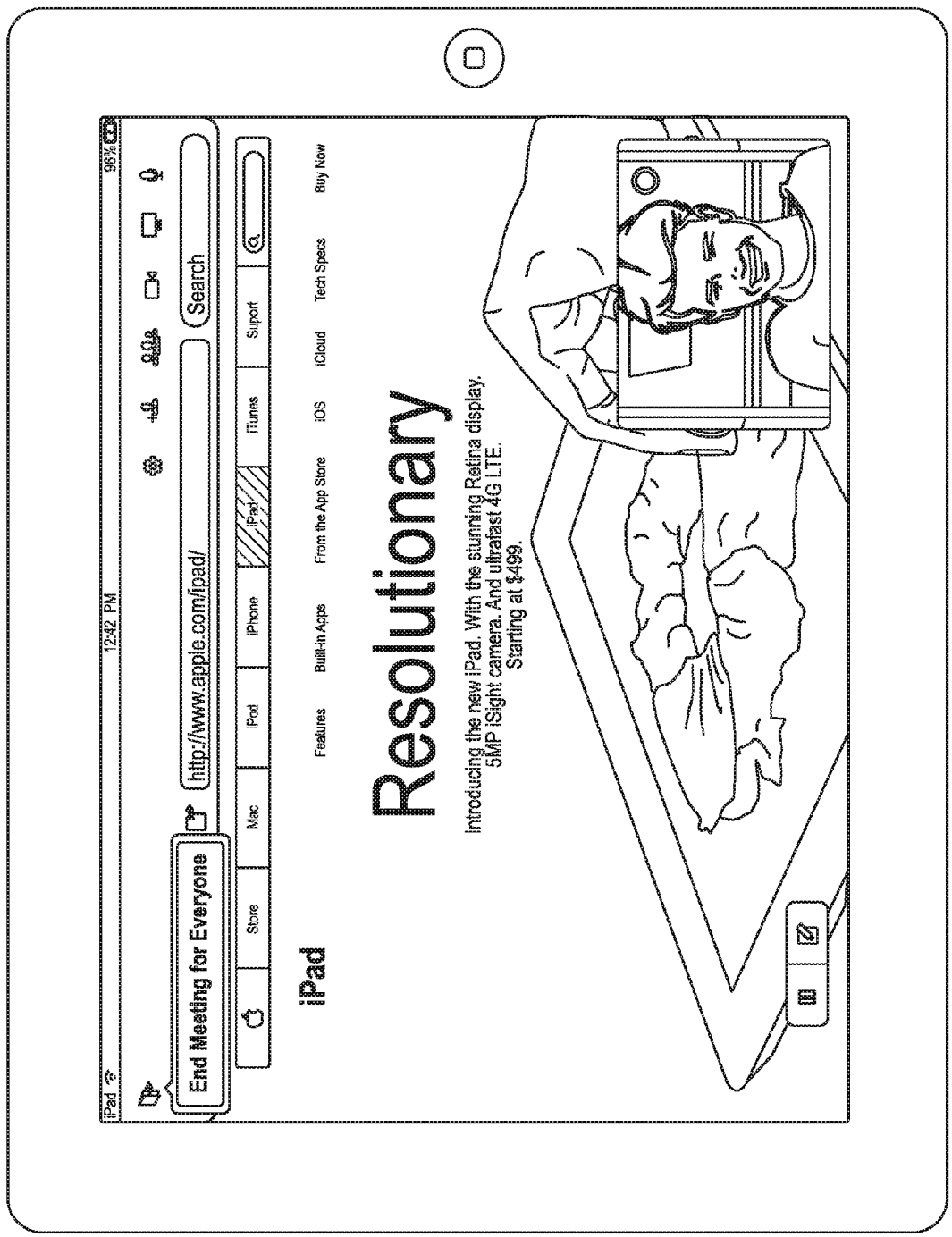
Figure 5R:
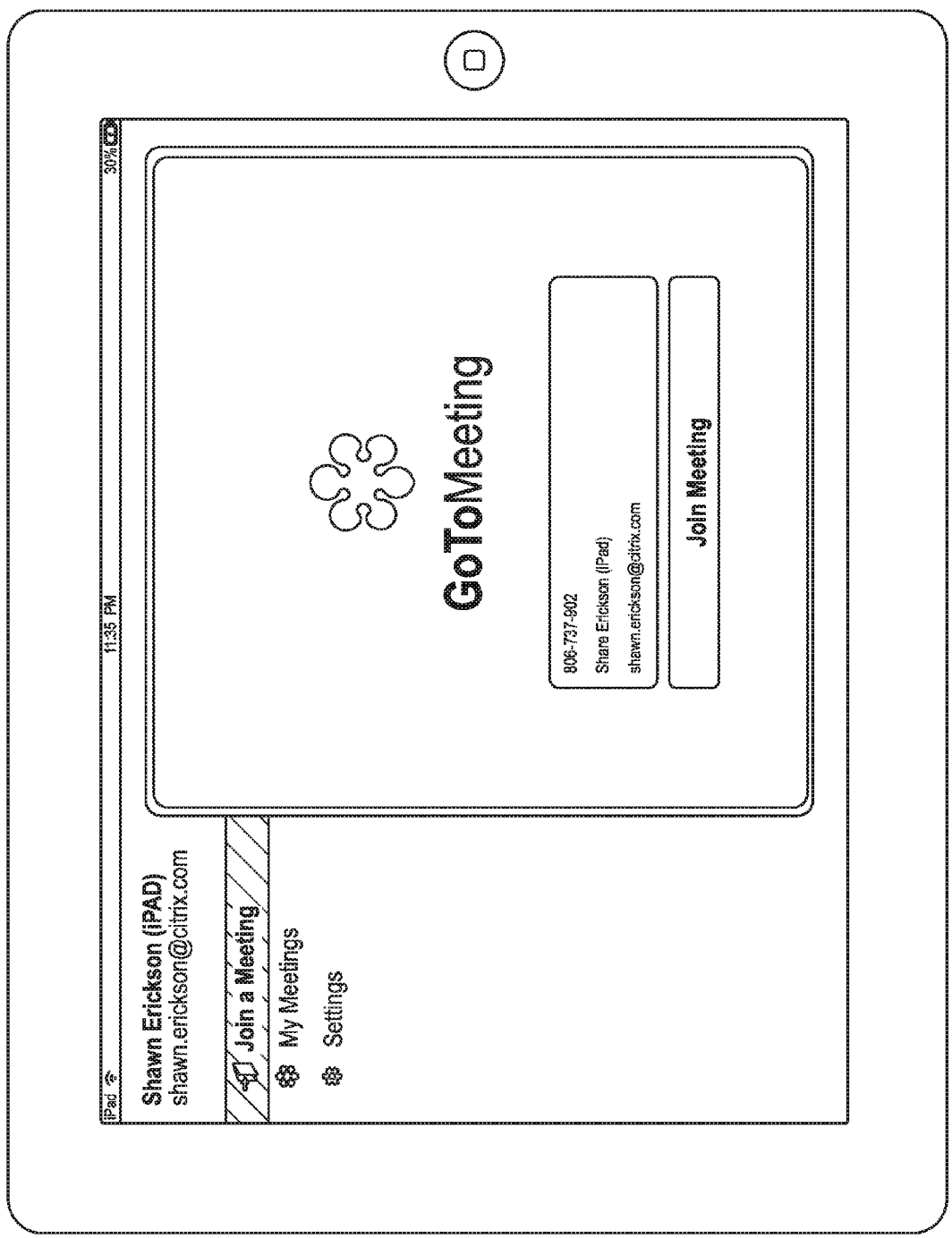
Figure 5S:
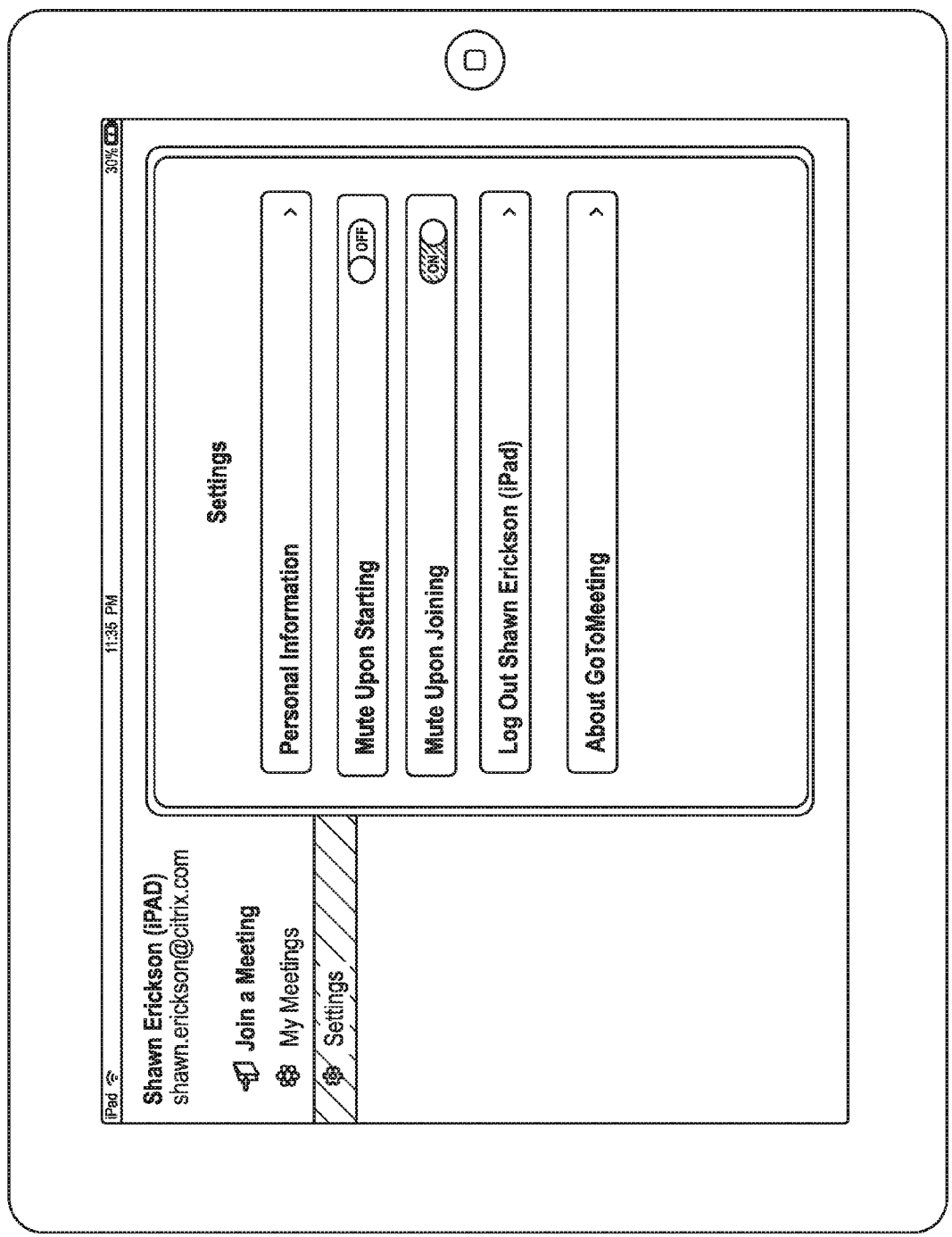
Figure 5T:
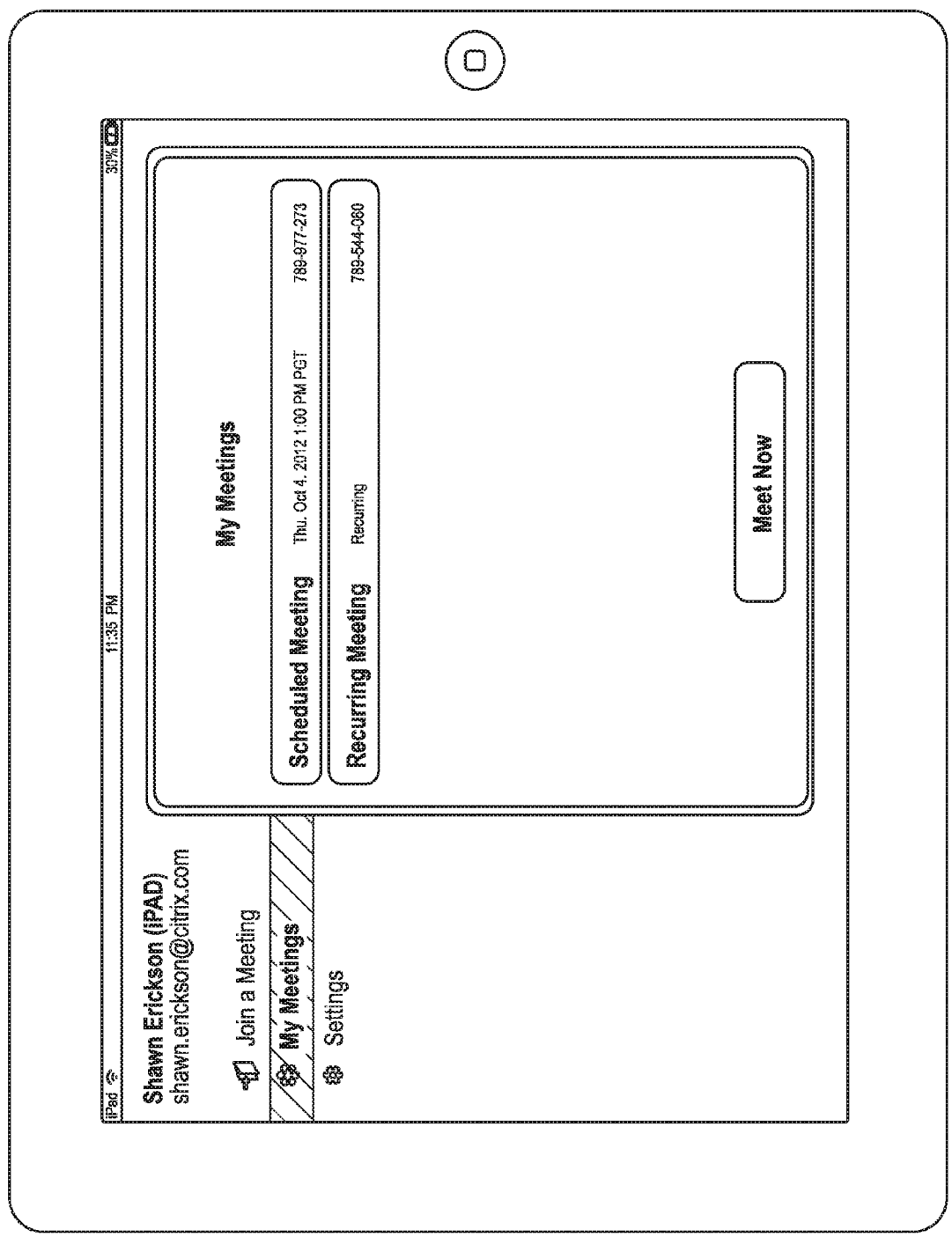
Figure 5U:
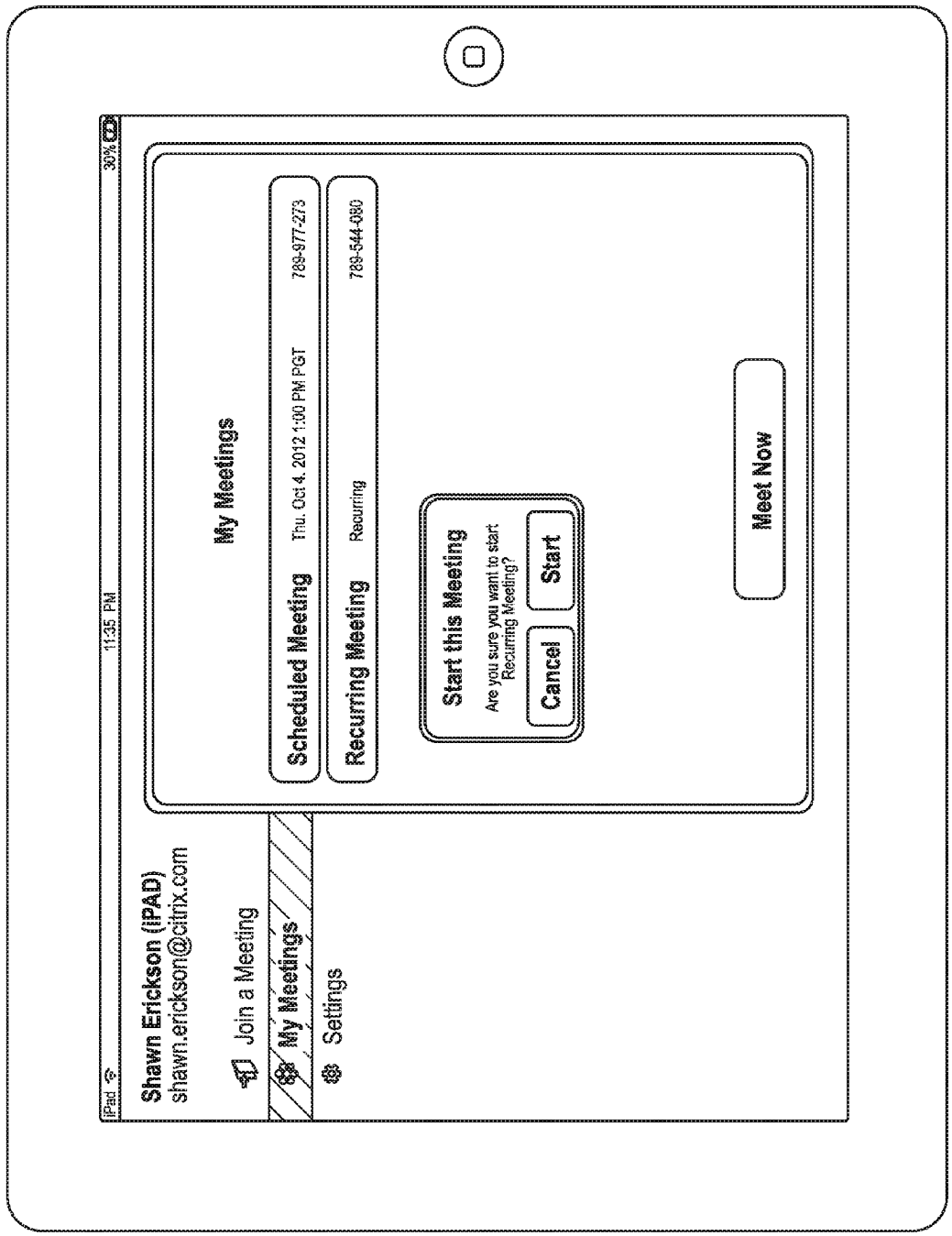

FIGS. 5A-5U illustrate example user interfaces for capturing and sharing visual content via an application. The user interfaces may be provided via a client computing device that captures and shares the visual content (e.g., client computing device 200), which may be a tablet computer.

Figure 4:
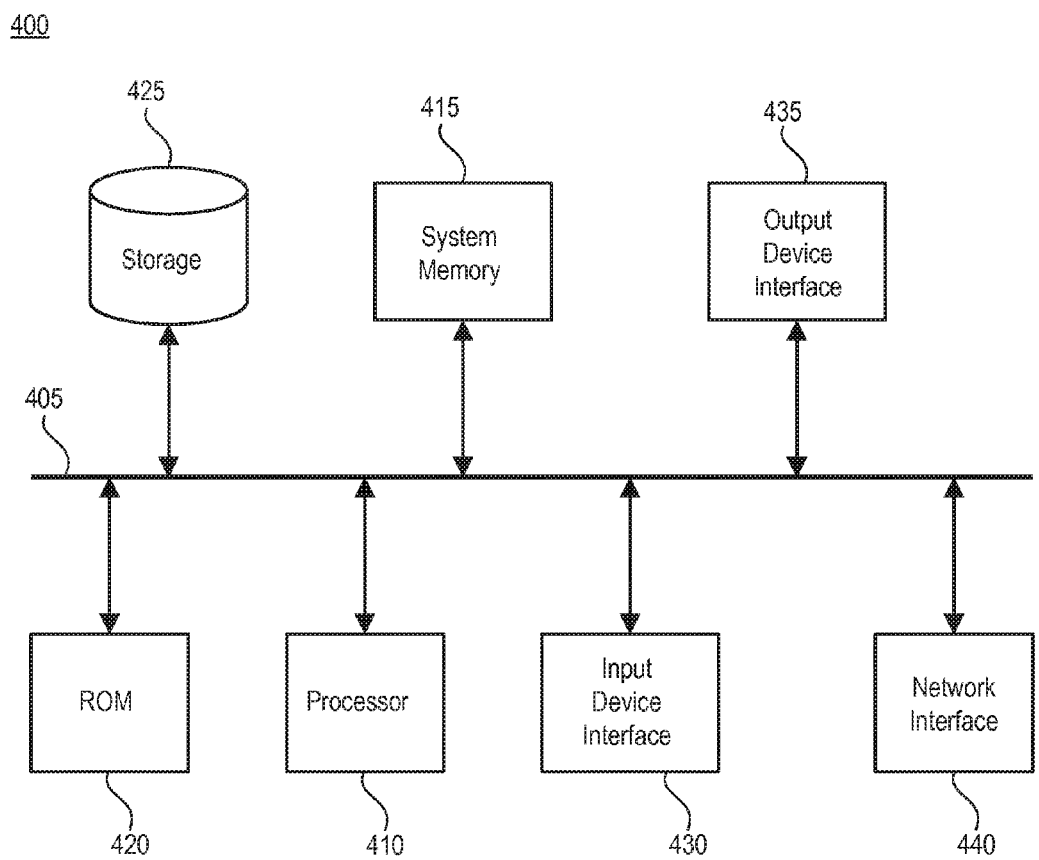
FIG. 4 conceptually illustrates an example electronic system with which some implementations of the subject technology are implemented.

FIG. 4 conceptually illustrates an electronic system 400 with which some implementations of the subject technology are implemented. For example, one or more of the server 110 or the client computing devices 130.1-4 or 200 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for capturing and sharing visual content via an application in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touch screen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The invention claimed is:

1. A computer-implemented method for capturing content for sharing, the method comprising:
    instantiating a content capturing application on a first computing device;
    instantiating a visual output providing application for execution within the content capturing application, wherein the visual output providing application does not execute independently of the content capturing application, and wherein the visual output providing application is configured to display an image;
    providing for presentation of the image displayed by the visual output providing application via the first computing device;
    capturing, via operation of the content capturing application, at least a portion of the image displayed by the visual output providing application; and
    facilitating transmission, via a network, of the captured at least the portion of the image displayed by the visual output providing application to a second computing device.

2. The method of claim 1, wherein an operating system of the first computing device is configured not to allow a first application executing within the operating system to capture a first image generated outside the first application.

3. The method of claim 1, wherein the content capturing application comprises an online meeting application, and wherein the first computing device and the second computing device are associated with participants in the online meeting.

4. The method of claim 1, wherein the visual output providing application comprises one or more of a web browser, an image viewing application, a slide presentation application, a word processing application, a file sharing application, or a sketch pad application.

5. The method of claim 1, wherein the visual output providing application provides both a visual and an audio output, the method further comprising:
    facilitating transmission, via the network, of the audio output provided by the visual output providing application to the second computing device.

6. The method of claim 5, wherein the visual output providing application comprises one or more of a video player application or an audio player application.

7. The method of claim 1, further comprising:
receiving, from a user of the first computing device, an annotation for the image displayed by the visual output providing application, wherein the captured at least the portion of the image displayed by the visual output providing application is transmitted to the second computing device in conjunction with at least a portion of the annotation.

8. The method of claim 1, wherein the image displayed by the visual output providing application is overlaid, on the first computing device, with additional content, the method further comprising:
facilitating presentation of the captured at least the portion of the image displayed by the visual output providing application via the second computing device, wherein the at least the portion of the image displayed by the visual output providing application presented via the second computing device is not overlaid with the additional content.

9. The method of claim 8, wherein the additional content comprises one or more of a control for the content capturing application or a video stream received from the second computing device.

10. The method of 8, wherein facilitating presentation of the captured portion of the image displayed by the visual output providing application via the second computing device includes transmitting the captured portion of the image displayed by the visual output providing application to the second computing device without the additional content, whereby the portion of the image displayed by the visual output providing application is displayed by the second computing device without the additional content.

11. The method of claim 1, wherein the first computing device comprises a tablet computer.

12. The method of claim 1, wherein capturing the portion of the image displayed by the visual output providing application includes the content capturing application capturing, while the visual output providing application executes within the content capturing application, pixels that the visual output providing application provides to a display unit of the first computing device.

13. The method of claim 1, wherein an operating system of the first computing device is configured not to allow a first application executing within the operating system to screen capture visual content being displayed by any other application executing within the operating system.

14. A non-transitory computer-readable medium for capturing content for sharing, the computer-readable medium comprising instructions which, when executed by one or more computers, cause the one or more computers to perform a method, the method comprising:
instantiating a content capturing application on a first computing device;
instantiating a visual output providing application for execution within the content capturing application, wherein the visual output providing application does not execute independently of the content capturing application, and wherein the visual output providing application is configured to display an image;
providing for presentation of the image displayed by the visual output providing application via the first computing device;
capturing, via operation of the content capturing application, at least a portion of the image displayed by the visual output providing application; and
facilitating transmission, via a network, of the captured at least the portion of the image displayed by the visual output providing application to a second computing device.

15. The non-transitory computer-readable medium of claim 14, wherein an operating system of the first computing device is configured not to allow a first application executing within the operating system to capture a first image generated outside the first application.

16. The non-transitory computer-readable medium of claim 14, wherein the content capturing application comprises an online meeting application, and wherein the first computing device and the second computing device are associated with participants in the online meeting.

17. The non-transitory computer-readable medium of claim 14, wherein the visual output providing application comprises one or more of a web browser, an image viewing application, a slide presentation application, a word processing application, a file sharing application, or a sketch pad application.

18. The non-transitory computer-readable medium of claim 14, wherein the visual output providing application provides both a visual and an audio output, the method further comprising:
facilitating transmission, via the network, of the audio output provided by the visual output providing application to the second computing device.

19. The non-transitory computer-readable medium of claim 18, wherein the visual output providing application comprises one or more of a video player application or an audio player application.

20. The non-transitory computer-readable medium of claim 14, further comprising:
receiving, from a user of the first computing device, an annotation for the image displayed by the visual output providing application, wherein the captured at least the portion of the image displayed by the visual output providing application is transmitted to the second computing device in conjunction with at least a portion of the annotation.

21. The non-transitory computer-readable medium of claim 14, wherein the image displayed by the visual output providing application is overlaid, on the first computing device, with additional content, the method further comprising:
facilitating presentation of the captured at least the portion of the image displayed by the visual output providing application via the second computing device, wherein the at least the portion of the image displayed by the visual output providing application presented via the second computing device is not overlaid with the additional content.

22. The non-transitory computer-readable medium of claim 21, wherein the additional content comprises one or more of a control for the content capturing application or a video stream received from the second computing device.

23. The non-transitory computer-readable medium of claim 14, wherein the first computing device comprises a tablet computer.

24. A computing device comprising:
one or more processors; and
a memory storing:
  an operating system; and
  one or more applications, including a screen capturing application, executing within the operating system, the screen capturing application comprising:
    one or more embedded applications executing within the screen capturing application; and
    a screen capturing module programmed to capture an image generated by the one or more embedded applications.

25. The computing device of claim 24, the memory further storing operating system settings, wherein the operating system settings specify that a first application from among the one or more applications executing within the operating system cannot screen capture a first image generated outside the first application.

26. The computing device of claim 25, wherein the first image generated outside the first application is generated via a home display of the operating system.

27. The computing device of claim 25, wherein the first image generated outside the first application is generated via a second application from among the one or more applications executing within the operating system.

28. The computing device of claim 24, wherein the computing device is a tablet computer or a mobile phone.

29. The computing device of claim 24, wherein the screen capturing module is further programmed to capture an image generated by the screen capturing application.

* * * * *